US011250456B2

(12) United States Patent
Schumacher et al.

(10) Patent No.: US 11,250,456 B2
(45) Date of Patent: Feb. 15, 2022

(54) SYSTEMS, METHOD AND APPARATUS FOR AUTOMATED INVENTORY INTERACTION

(71) Applicant: Adroit Worldwide Media, Inc., Aliso Viejo, CA (US)

(72) Inventors: Greg Schumacher, Aliso Viejo, CA (US); Kevin Howard, Aliso Viejo, CA (US); Emad Mirgoli, Aliso Viejo, CA (US)

(73) Assignee: Adroit Worldwide Media, Inc., Aliso Viejo, CA (US)

( * ) Notice: Subject to any disclaimer, the term of this patent is extended or adjusted under 35 U.S.C. 154(b) by 46 days.

(21) Appl. No.: 16/598,557

(22) Filed: Oct. 10, 2019

(65) Prior Publication Data

US 2020/0118154 A1 Apr. 16, 2020

Related U.S. Application Data

(60) Provisional application No. 62/743,734, filed on Oct. 10, 2018.

(51) Int. Cl.
*G06Q 30/02* (2012.01)
*G06K 9/00* (2006.01)
*G06Q 10/08* (2012.01)

(52) U.S. Cl.
CPC ..... *G06Q 30/0223* (2013.01); *G06K 9/00201* (2013.01); *G06K 9/00771* (2013.01); *G06Q 10/087* (2013.01); *G06Q 30/0267* (2013.01)

(58) Field of Classification Search
CPC .................................................... G06Q 30/02
See application file for complete search history.

(56) References Cited

U.S. PATENT DOCUMENTS 8,484,076 B2 7/2013 Roberts et al.
8,672,427 B2 3/2014 Hammonds
(Continued)

FOREIGN PATENT DOCUMENTS

EP 2835764 A2 * 11/2015 ............... G06K 9/22
JP 5866559 B2 * 2/2016 ............. G06Q 30/06

OTHER PUBLICATIONS

Arenamation, Fascia LED Boards, Google, http://www.arenamation.com/fascia-led (Year: 2012).*
(Continued)

*Primary Examiner* — Marilyn G Macasiano
(74) *Attorney, Agent, or Firm* — Ravi Mohan; Rutan & Tucker, LLP

(57) ABSTRACT

In one embodiment, a proximity camera system is disclosed. The proximity camera system may include a proximity camera having a lens and a housing, fascia, and one or more processors communicatively coupled to the proximity camera and the fascia. The proximity camera system may additionally include a non-transitory computer-readable medium communicatively coupled to the one or more processors and having logic thereon, the logic, when executed by the one or more processors, being configured to perform operations including: (i) receiving an image captured by the proximity camera, (ii) performing object recognition techniques on the image, (iii) determining whether an object was detected within a first predetermined proximity region, and (iv) transmitting one or more instructions configured to cause a graphical display to be displayed by the fascia. In some embodiments, the proximity camera and the fascia may be coupled to a shelving unit.

20 Claims, 21 Drawing Sheets

(56) References Cited

U.S. PATENT DOCUMENTS

| | | |
|---|---|---|
| 9,990,644 B2 | 6/2018 | Walden |
| 10,373,189 B2 | 8/2019 | Walden |
| 10,373,190 B2 | 8/2019 | Walden |
| 2007/0076251 A1* | 4/2007 | Yasuda ................. H04N 5/445 358/1.15 |
| 2012/0060165 A1 | 3/2012 | Clarke |
| 2014/0249928 A1 | 9/2014 | McMillan et al. |
| 2016/0371735 A1 | 12/2016 | Walden |
| 2017/0011427 A1 | 1/2017 | Walden |
| 2017/0011429 A1 | 1/2017 | Walden |
| 2017/0017290 A1 | 1/2017 | Walden |
| 2017/0017994 A1 | 1/2017 | Walden |
| 2017/0018004 A1 | 1/2017 | Walden |
| 2017/0018005 A1 | 1/2017 | Walden |
| 2017/0018006 A1 | 1/2017 | Walden |
| 2017/0019764 A1 | 1/2017 | Walden |
| 2017/0053315 A1 | 2/2017 | Walden |
| 2017/0053316 A1 | 2/2017 | Walden |
| 2017/0068978 A1 | 3/2017 | Walden |
| 2018/0025688 A1 | 1/2018 | Howard et al. |
| 2019/0149725 A1* | 5/2019 | Adato ................ H04N 1/32144 348/158 |

OTHER PUBLICATIONS

International Search Report and Written Opinion, PCT Application No. PCT/US19/55649, dated Jan. 8, 2020.

\* cited by examiner

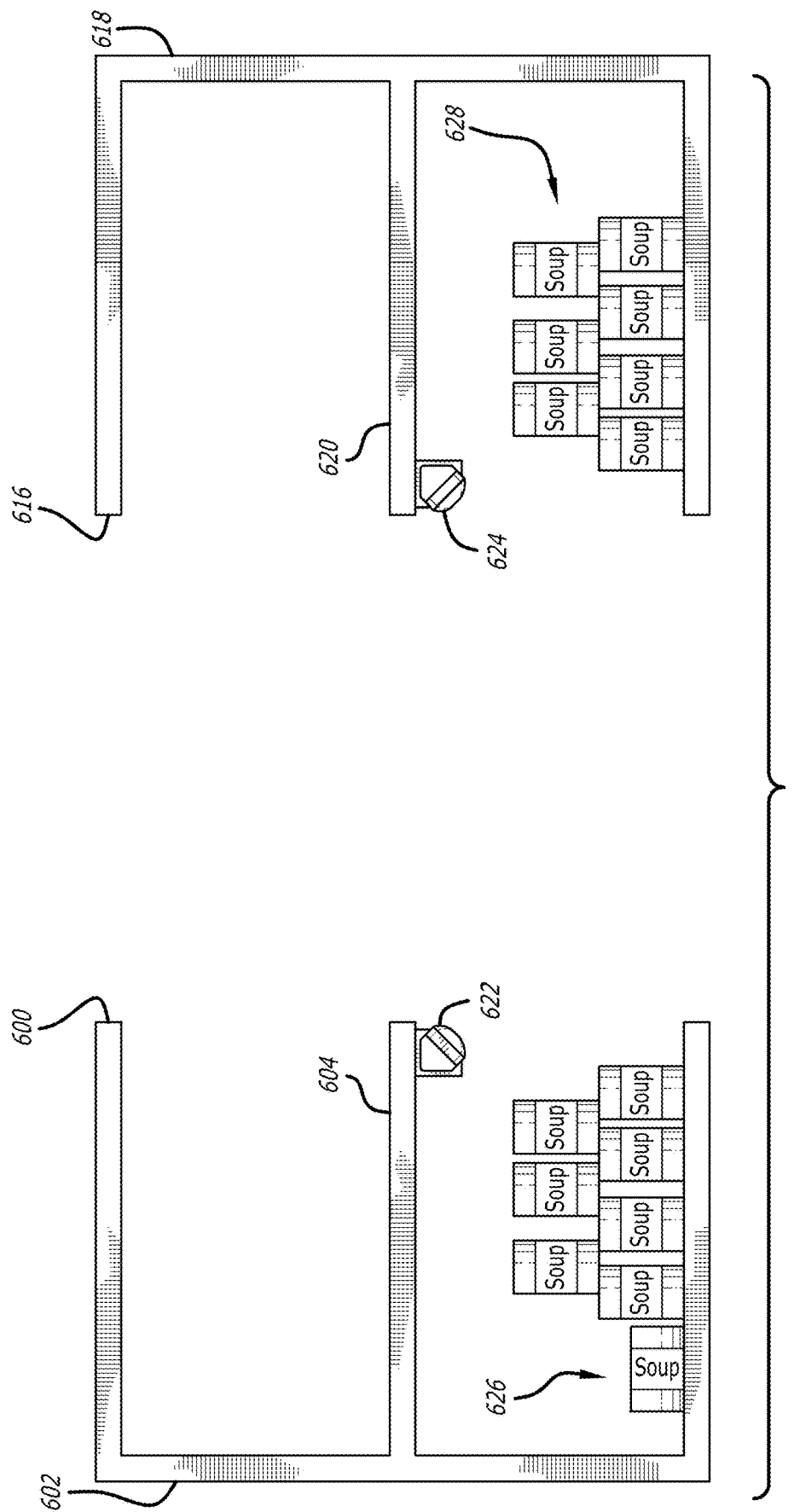

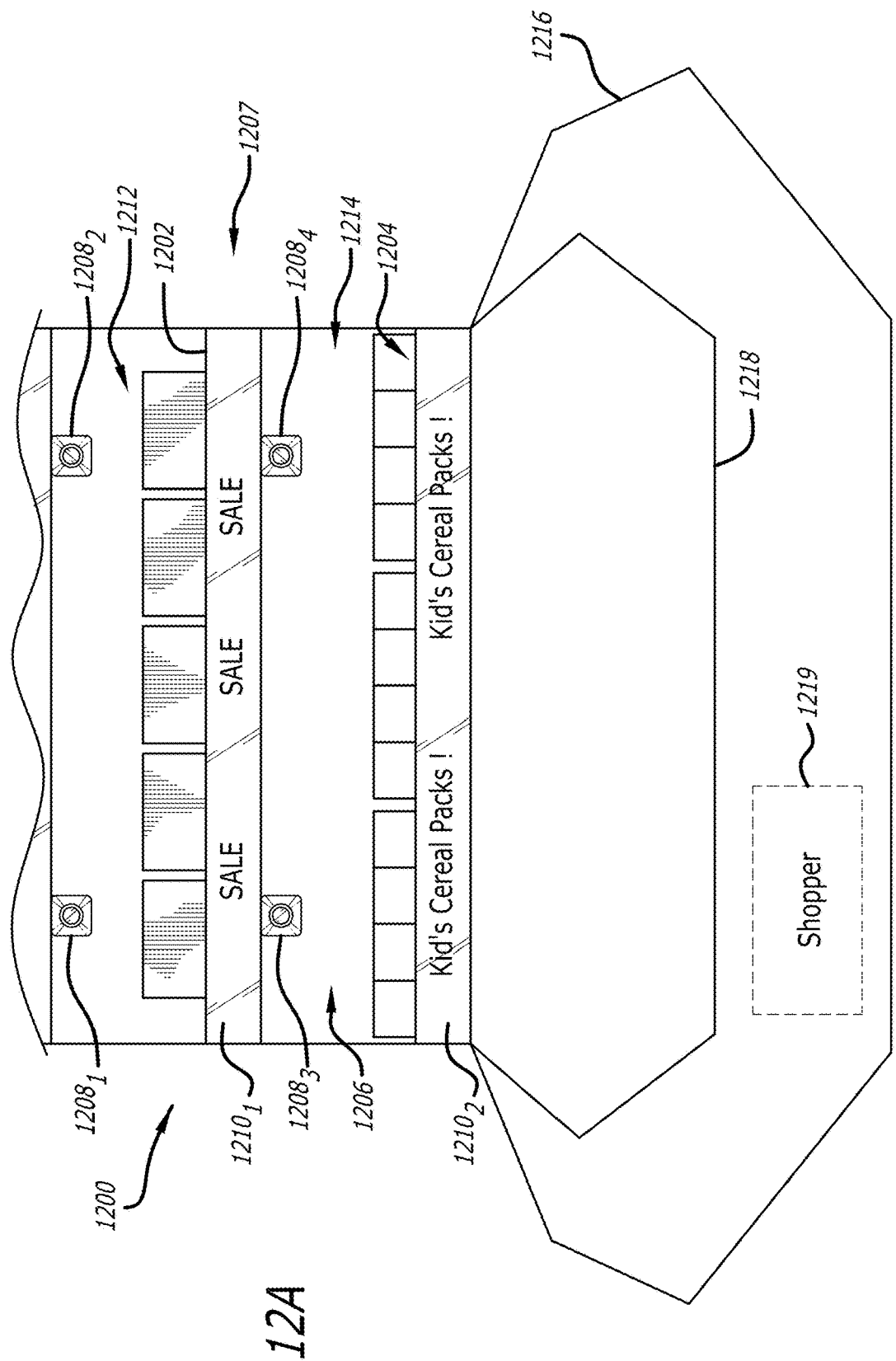

SYSTEMS, METHOD AND APPARATUS FOR AUTOMATED INVENTORY INTERACTION

PRIORITY

This application claims the benefit of priority to U.S. Provisional Patent Application No. 62/743,734, filed Oct. 10, 2018, titled "Systems, Method and Apparatus for Automated Inventory Interaction," which is hereby incorporated by reference into this application in its entirety.

BACKGROUND

Retail environments are ever challenging. Consumers typically are confronted with pricing and information about a continuously increasing number of competitors and brands, including information about pricing, labeling, promotions, and the like. Traditionally, this information has been provided using print systems, such as slide-in paper systems, plastic label systems, and adhesive label systems. However, consumers are increasingly confounded by the sheer volume of printed information displayed in retail environments, and thus a growing number of consumers are turning to online shopping for day-to-day purchases. Furthermore, a retailer's overall performance and profits are significantly impacted by the challenge of getting the right products to the right places at the right time.

In addition, retailers are constantly concerned with the stocking of their shelves. A retailer may lose money due to a failure to restock inventory. For example, a customer may approach a shelf seeking to purchase a particular item; however, the shelf indicated as the location of the particular item may be empty. In some situations, a retailer may have that particular item stored in the back of the store but due to a lack of knowledge that the shelf was empty, the shelf was not restocked with the item causing the retailer to lose the money the customer would have spent on purchasing the particular item. Such a situation occurs at a high rate and may cost a retailer thousands or even millions of dollars in lost revenue each year.

Furthermore, customers often enter a retail location or pass by a retail exhibit (e.g., vending machine or small retail stand such as in a mall, an airport, a hospital, etc.) and fail to notice objects on some shelving units or fail to realize promotions or discounts apply to certain objects. When shopping at a retail location, customers are often distracted for a variety of reasons including looking at their mobile device, talking on their mobile device and/or watching children.

SUMMARY

In one embodiment, an proximity camera system, comprises a proximity camera having a lens and a housing, one or more fascia, one or more processors communicatively coupled to the proximity camera and the one or more fascia, and a non-transitory computer-readable medium communicatively coupled to the one or more processors and having logic thereon, the logic, when executed by the one or more processors, being configured to perform operations including: (i) receiving an image captured by the proximity camera, (ii) performing object recognition techniques on the image, (iii) determining whether an object was detected within a first predetermined proximity region, and (iv) transmitting one or more instructions configured to cause a graphical display to be displayed by the one or more fascia.

In one embodiment, the proximity camera and the one or more fascia are coupled to a shelving unit. Additionally, the image illustrates a geo-fence region at least partially surrounding the shelving unit, the geo-fence region including the first predetermined proximity region. In some embodiments, the logic is configured to determine whether a second object is detected within a second predetermined proximity region, the second proximity region including a physical area closer to the shelving unit than the first predetermined proximity region.

In one embodiment, the image is transmitted to a cloud computing service for analysis of the first predetermined proximity region. Additionally, the graphical display displayed by the one or more fascia may include an immersive graphic. In some embodiments, the immersive graphic spans a plurality of the one or more fascia. In one embodiment, a cabinet display top may be communicatively coupled to the one or more processors and the non-transitory computer-readable medium, and the immersive graphic spans a plurality of the one or more fascia and the cabinet display top. In some embodiments, the graphical display displayed by the one or more fascia includes a product information graphic, wherein the product information graphic includes at least pricing information for one or more inventory items. In other embodiments, the graphical display displayed by the one or more fascia includes a promotional graphic, wherein the promotional graphic includes at least information corresponding to a promotion or discount for one or more inventory items.

In one embodiment a computerized method is disclosed. The method includes receiving an image captured by the proximity camera, performing object recognition techniques on the image, determining whether an object was detected within a first predetermined proximity region, and transmitting one or more instructions configured to cause a graphical display to be displayed by the one or more fascia. In some embodiments of the computerized method, the proximity camera and the one or more fascia are coupled to a shelving unit. The image may illustrates a geo-fence region at least partially surrounding the shelving unit, the geo-fence region including the first predetermined proximity region.

In some embodiments, the computerized method may further include determining whether a second object is detected within a second predetermined proximity region, the second proximity region including a physical area closer to the shelving unit than the first predetermined proximity region. In yet other embodiments of the computerized method, the graphical display displayed by the one or more fascia includes an immersive graphic that spans a plurality of the one or more fascia.

In one embodiment a non-transitory computer readable storage medium having stored thereon instructions is disclosed. In some embodiments, the instructions are executable by one or more processors to perform operations including receiving an image captured by the proximity camera, performing object recognition techniques on the image, determining whether an object was detected within a first predetermined proximity region, and transmitting one or more instructions configured to cause a graphical display to be displayed by the one or more fascia. In some embodiments, the proximity camera and the one or more fascia are coupled to a shelving unit. In some embodiments, the image illustrates a geo-fence region at least partially surrounding the shelving unit, the geo-fence region including the first predetermined proximity region.

In other embodiments, the instructions are executable by the one or more processors to perform further operations including determining whether a second object is detected within a second predetermined proximity region, the second proximity region including a physical area closer to the shelving unit than the first predetermined proximity region. In yet other embodiments, the graphical display displayed by the one or more fascia includes an immersive graphic that spans a plurality of the one or more fascia.

BRIEF DESCRIPTION OF THE DRAWINGS

The invention may best be understood by referring to the following description and accompanying drawings that are used to illustrate embodiments of the invention. In the drawings:

FIG. 6C provides a schematic illustrating a sensor such as an inventory camera coupled to the automated inventory intelligence system in accordance with some embodiments;

FIG. 12A provides an exemplary illustration of a plurality of proximity regions based on one configuration of a proximity sensor of an automated inventory intelligence system in accordance with some embodiments;

DETAILED DESCRIPTION

Figure 1:
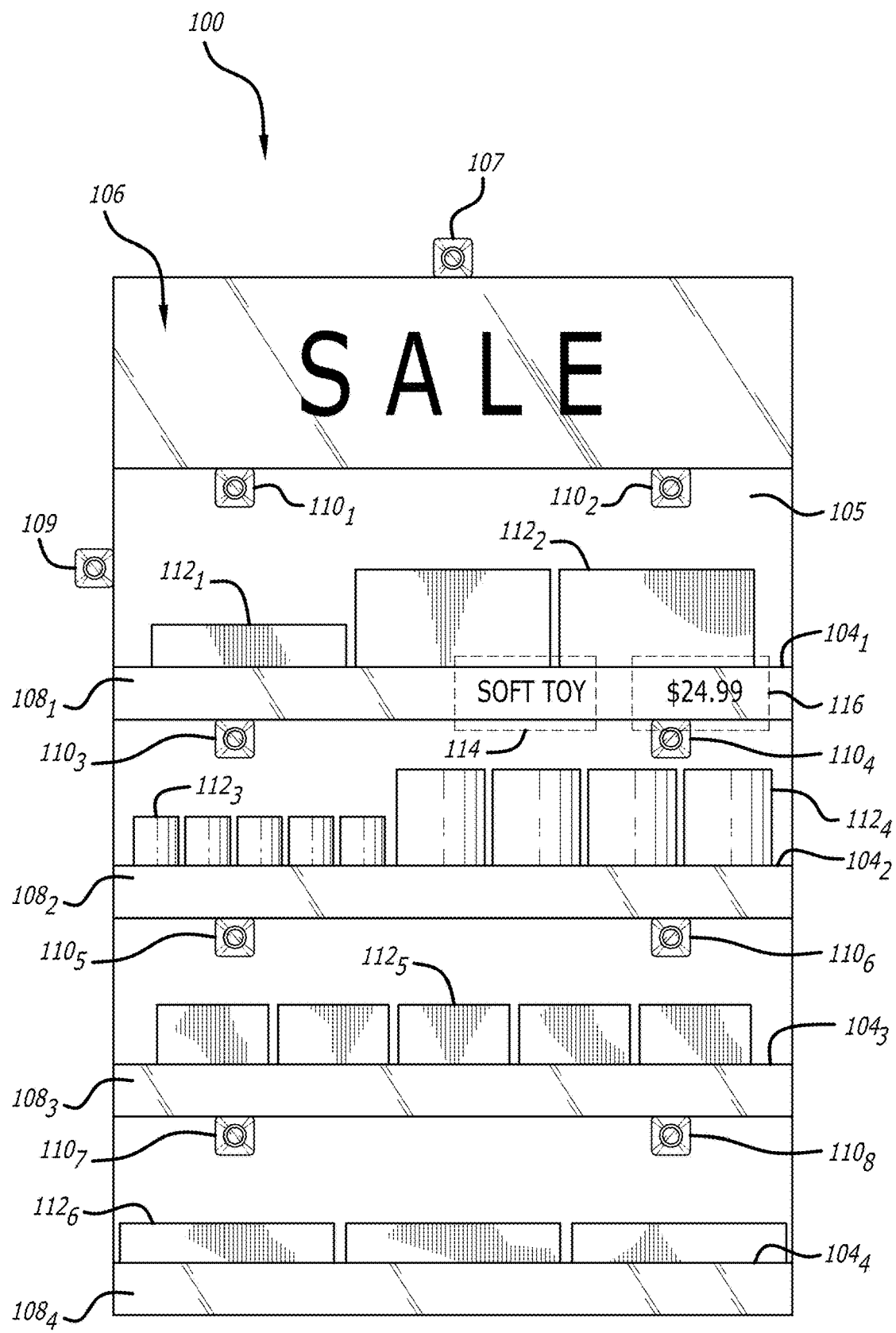
FIG. 1 provides an illustration of an automated inventory intelligence system in accordance with some embodiments.

In response to the problems outlined above, a continuing need exists for solutions that help retailers increase operational efficiencies, create intimate customer experiences, streamline processes, and provide real-time understanding of customer behavior in the store. Provided herein are automated inventory intelligence systems and methods that address the foregoing. Thus, it would be advantageous for retail locations and manufacturers that have inventory for sale at retail locations to be able to: (i) cause customers to notice a particular shelving unit, and (ii) provide entertaining and attractive graphics that grab customers' attention and also provide promotion as well as product information.

Before some particular embodiments are provided in greater detail, it should be understood that the particular embodiments provided herein do not limit the scope of the concepts provided herein. It should also be understood that a particular embodiment provided herein can have features that may be readily separated from the particular embodiment and optionally combined with or substituted for features of any of a number of other embodiments provided herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise. Unless defined otherwise, all technical and scientific terms used herein have the same meaning as commonly understood by those of ordinary skill in the art.

In general, the present disclosure describes an apparatus and a method for an automated inventory intelligence system that provides intelligence in tracking inventory on, for example retail shelves, as well intelligence in determining the proximity of retail customers as they approach, stall and pass a particular retail shelf or display and the demographics of the retail customers. In one embodiment, the automated inventory intelligence system is comprised of a cabinet top display, fascia, a proximity sensor, one or more inventory sensors, and one or more demographic tracking sensors. The cabinet top display can be configured to display animated and/or graphical content and is mounted on top of in-store shelves. In many embodiments, the fascia may include one or more panels of light-emitting diodes (LEDs) configured to display animated and/or graphical content and to mount to an in-store retail shelf. It would be understood by those skilled in the art that other light-emitting technologies may be utilized that can provide sufficient brightness, resolution, contrast, and/or color response. The automated inventory intelligence system can also include a data processing system comprising a media player that is configured to simultaneously execute (i.e., "play") a multiplicity of media files that are displayed on the cabinet top and/or the fascia. The cabinet top and the fascia are typically configured to display content so as to entice potential customers to approach the shelves, and then the fascia may switch to displaying pricing and other information pertaining to the merchandise on the shelves once a potential customer approaches the shelves. The proximity sensor is configured to detect the presence of potential customers. Further, one or more inventory sensors may be configured to track the inventory stocked on one or more in-store retail shelves. The automated inventory intelligence system may create one or more alerts once the stocked inventory remaining on the shelves is reduced to a predetermined minimum threshold quantity.

I. System Architecture

Referring now to FIG. 1, an illustration of an automated inventory intelligence system 100 in accordance with some embodiments is shown. The automated inventory intelligence system 100 comprises a proximity camera 107, fascia $108_1$-$108_4$, a plurality of inventory cameras $110_1$-$110_i$ (wherein i≤1, herein, i=8) and a facial recognition camera 109. It is noted that the disclosure is not limited to the automated inventory intelligence system 100 including a single cabinet display top 106 but may include a plurality of cabinet top displays 106. Additionally, the automated inventory intelligence system 100 is not limited to the number of fascia, shelving units, proximity cameras, facial recognition cameras and/or inventory cameras shown in FIG. 1. In typical embodiments, the automated inventory intelligence system 100 couples to a shelving unit 102, which often includes shelves 104, a back component 105 (e.g., pegboard, gridwall, slatwall, etc.) and a cabinet top display 106.

In many embodiments, the cabinet display top 106 is coupled to an upper portion of the shelving unit 102, extending vertically from the back component 105. Further, a proximity camera 107 may be positioned on top of, or otherwise affixed to, the cabinet top display 106. Although the proximity camera 107 is shown in FIG. 1 as being centrally positioned atop the cabinet top display 106, the proximity camera 107 may be positioned in different locations, such as near either end of the top of the cabinet top 106, on a side of the cabinet top 106 and/or at other locations coupled to the shelving unit 102 and/or the fascia 108.

The cabinet display top 106 and fascia 108 may be attached to the shelves 104 by way of any fastening means deemed suitable, wherein examples include, but are not limited or restricted to, magnets, adhesives, brackets, hardware fasteners, and the like. In a variety of embodiments, the fascia 108 and the cabinet display top 106 may each be comprised of one or more arrays of light emitting diodes (LEDs) that are configured to display visual content (e.g., still or animated content), with optional speakers, not shown, coupled thereto to provide audio content. Any of the fascia 108 and/or the cabinet display top 106 may be comprised of relatively smaller LED arrays that may be coupled together so as to tessellate the cabinet display top 106 and the fascia 108, such that the fascia and cabinet top desirably extend along the length of the shelves 104. The smaller LED arrays may be comprised of any number of LED pixels, which may be organized into any arrangement to conveniently extend the cabinet display top 106 and the fascia 108 along the length of a plurality of shelves 104. In some embodiments, for example, a first dimension of the smaller LED arrays may be comprised of about 132 or more pixels. In some embodiments, a second dimension of the smaller LED arrays may be comprised of about 62 or more pixels.

The cabinet display top 106 and the fascia 108 may be configured to display visual content to attract the attention of potential customers. As shown in the embodiment of FIG. 1, the cabinet display top 106 may display desired visual content that extends along the length of the shelves 104. The desired content may be comprised of a single animated or graphical image that fills the entirety of the cabinet display top 106, or the desired content may be a group of smaller, multiple animated or graphical images that cover the area of the cabinet display top 106. In some embodiments, the fascia 108 may cooperate with the cabinet display top 106 to display either a single image or multiple images that appear to be spread across the height and/or length of the shelves 104.

In some embodiments, the cabinet display top 106 may display visual content selected to attract the attention of potential customers to one or more products comprising inventory 112, e.g., merchandise, located on the shelves 104. Thus, the visual content shown on the cabinet display top 106 may be specifically configured to draw the potential customers to approach the shelves 104, and is often related to the specific inventory 112 located on the corresponding shelves 104. A similar configuration with respect to visual content displayed on the fascia 108 may apply as well, as will be discussed below. The content shown on the cabinet display top 106, as well as the fascia 108, may be dynamically changed to engage and inform customers of ongoing sales, promotions, and advertising. As will be appreciated, these features offer brands and retailers a way to increase sales locally by offering customers a personalized campaign that may be easily changed quickly.

Moreover, as referenced above, portions of the fascia 108 may display visual content such as images of brand names and/or symbols representing products stocked on the shelves 104 nearest to each portion of the fascia. For example, in an embodiment, a single fascia 108 may be comprised of a first portion 114 and a second portion 116. The first portion 114 may display an image of a brand name of inventory 112 that is stocked on the shelf above the first portion 114 (e.g., in one embodiment, stocked directly above the first portion 114), while the second portion 116 may display pricing information for the inventory 112. Additional portions may include an image of a second brand name and/or varied pricing information when such portions correspond to inventory different than inventory 112. It is contemplated, therefore, that the fascia 108 extending along each of the shelves 104 may be sectionalized to display images corresponding to each of the products stocked on the shelves 104. It is further contemplated that the displayed images will advantageously simplify customers quickly locating desired products.

In an embodiment, the animated and/or graphical images displayed on the cabinet display top 106 and the fascia 108 are comprised of media files that are executed by way of a suitable media player. The media player is often configured to simultaneously play any desired number of media files that may be displayed on the smaller LED arrays. In some embodiments, each of the smaller LED arrays may display one media file being executed by the multiplayer, such that a group of adjacent smaller LED arrays combine to display the desired images to the customer. Still, in some embodiments, base video may be stretched to fit any of various sizes of the smaller LED arrays, and/or the cabinet display top 106 and fascia 108. It should be appreciated, therefore, that the multiplayer disclosed herein enables implementing a single media player per aisle in-store instead relying on multiple media players dedicated to each aisle.

Figure 5:
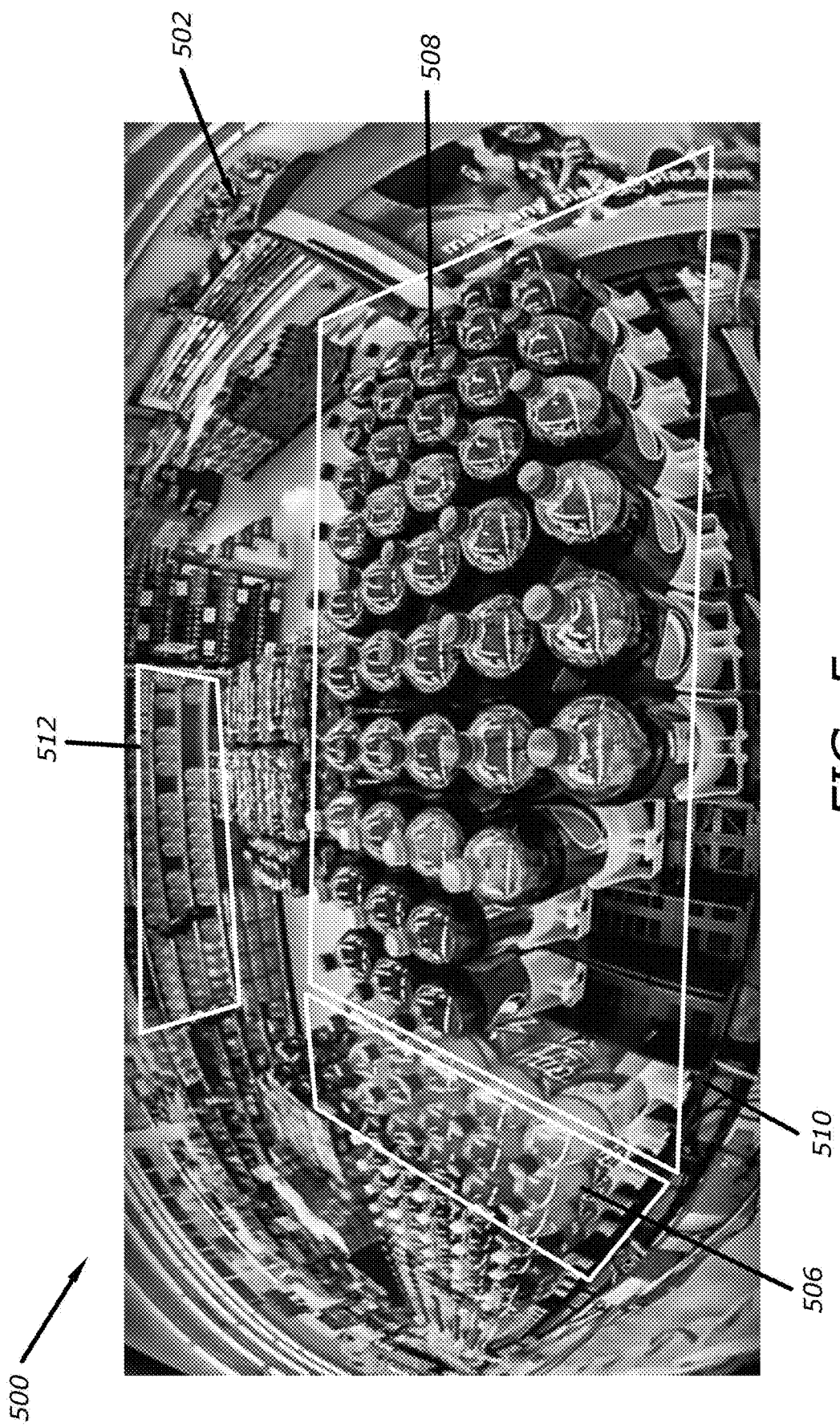
FIG. 5 provides an illustration of an image captured by a camera of an automated inventory intelligence system in accordance with some embodiments.

Furthermore, FIG. 1 illustrates a plurality of inventory cameras 110 (i.e., the inventory cameras $110_1$-$110_8$). In some embodiments, the inventory cameras 110 are coupled to the shelving unit 102, e.g., via the pegboard 105, and positioned above merchandise 112, also referred to herein as "inventory." Each of the inventory cameras 110 can be configured to monitor a portion of the inventory stocked on each shelf 104, and in some instances, may be positioned below a shelf 104, e.g., as is seen with the inventory cameras $110_3$-$110_8$. However, in some instances, an inventory camera 110 may not be positioned below a shelf 104, e.g., as is seen with the inventory cameras $110_1$-$110_2$. Taking the inventory camera $110_4$, as an example, the inventory camera $110_4$ is positioned above the inventory portion 116 and therefore capable of (and configured to), monitor the inventory portion 116. Although, it should be noted that the inventory camera $110_4$ may have a viewing angle of 180° (degrees) and is capable of monitoring a larger portion of the inventory 112 on the shelf $104_2$ than merely inventory portion 116. For example, FIG. 5 illustrates one exemplary image captured by an inventory camera having a viewing of 180°.

As is illustrated in FIGS. 2A-4 and 6A-6C and discussed with respect thereto, the positioning of the inventory cameras 110 may differ from the illustration of FIG. 1. In addition to being positioned differently with respect to spacing above inventory 112 on a particular shelf 104, the inventory cameras 110 degree may be affixed to the shelving unit 102 in a variety of manners, including attachment to various types of shelves 104 and monitoring of any available inventory 112 stored thereon.

In addition to the proximity camera 107 and the inventory cameras $110_1$-$110_8$, various embodiments of the automated inventory intelligence system 100 can also include a facial recognition camera 109. In one embodiment, the facial recognition camera 109 may be coupled to the exterior of the shelving unit 102. In some embodiments, the facial recognition camera 109 may be positioned between five to six feet from the ground in order to obtain a clear image of the faces of a majority of customers. The facial recognition camera 109 may be positioned at heights other than five to six feet from the ground. The facial recognition camera 109 need not be coupled to the exterior of the shelving unit 102 as illustrated in FIG. 1; instead, the illustration of FIG. 1 is merely one embodiment. The facial recognition camera 109 may be coupled to in the interior of a side of the shelving unit 109 as well as to any portion of any of the shelves $104_1$-$104_4$, the cabinet display top 106, the fascia 108 and/or the back component 105 of the shelving unit 102. Further, a plurality of facial recognition cameras 109 may be coupled to the shelving unit 102. In certain embodiments, the facial recognition camera 109 may be eliminated and its associated functions accomplished by any available proximity cameras 107. In these embodiments, software can be utilized to account for any discrepancy between the image and angles captured between the proximity cameras 107 as compared to the facial recognition cameras 109. In further embodiments, especially where privacy concerns are heightened, facial recognition cameras may be eliminated leaving the automated inventory intelligent system 100 to gather customer data by other means including, but not limited to, mobile phone signals/application data and/or radio-frequency identification (RFID) signals.

In some embodiments, the automated inventory intelligence system 100 may include one or more processors, a non-transitory computer-readable memory, one or more communication interfaces, and logic stored on the non-transitory computer-readable memory. The images or other data captured by the proximity sensor 107, the facial recognition camera 109 and/or the inventory cameras $110_1$-$110_8$ may be analyzed by the logic of the automated inventory intelligence system 100. The non-transitory computer-readable medium may be local storage, e.g., located at the store in which the proximity sensor 107, the facial recognition camera 109 and/or the inventory cameras $110_1$-$110_8$ reside, or may be cloud-computing storage. Similarly, the one or more processors may be local to the proximity sensor 107, the facial recognition camera 109 and/or the inventory cameras $110_1$-$110_8$ or may be provided by cloud computing services.

Examples of the environment in which the automated inventory intelligence system 100 may be located include, but are not limited or restricted to, a retailer, a warehouse, an airport, a high school, college or university, any cafeteria, a hospital lobby, a hotel lobby, a train station, or any other area in which a shelving unit for storing inventory may be located.

II. Inventory Sensors

Figure 2A:
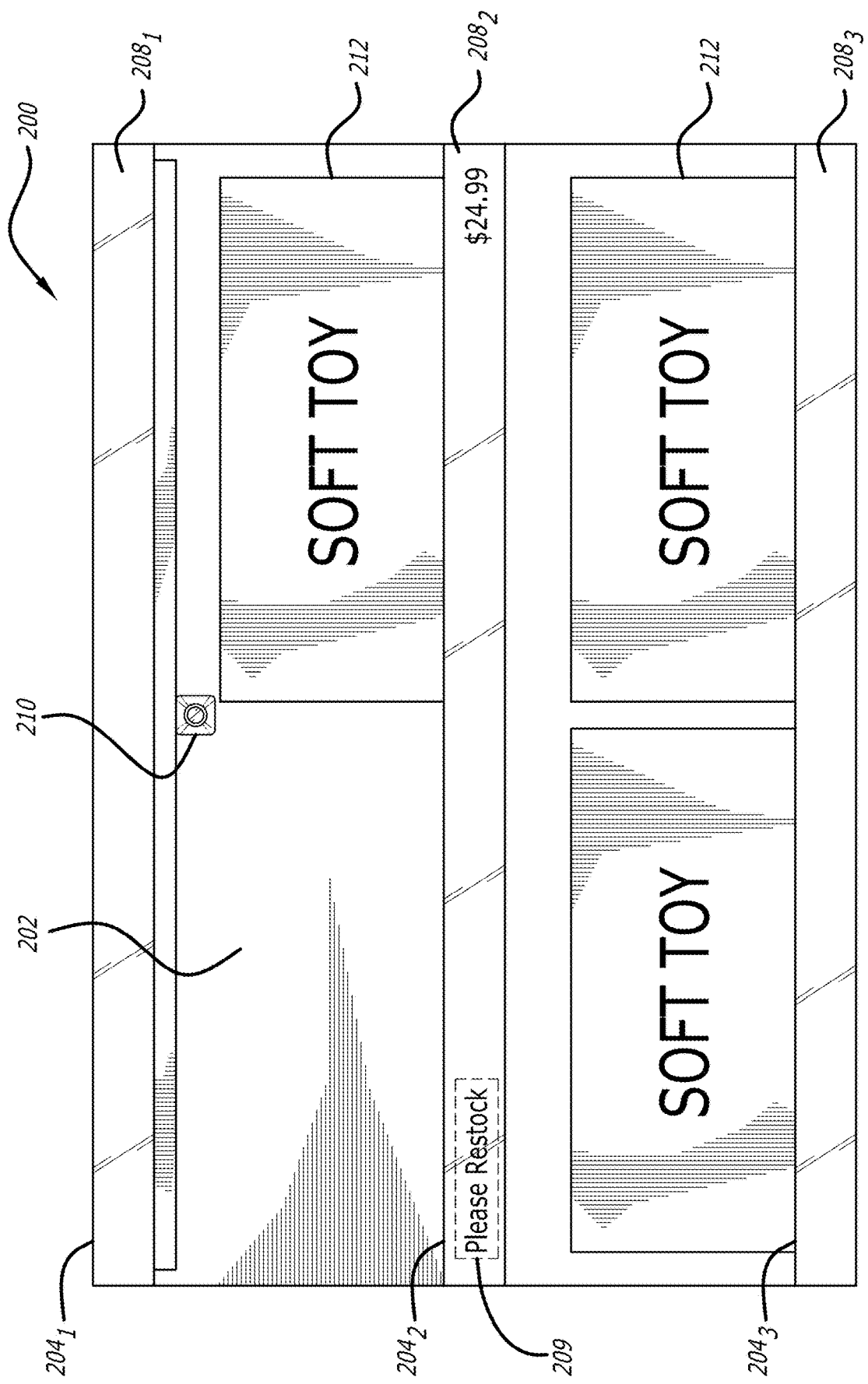
FIG. 2A provides a second illustration of a plurality of shelves with an automated inventory intelligence system in accordance with some embodiments.
Figure 2B:
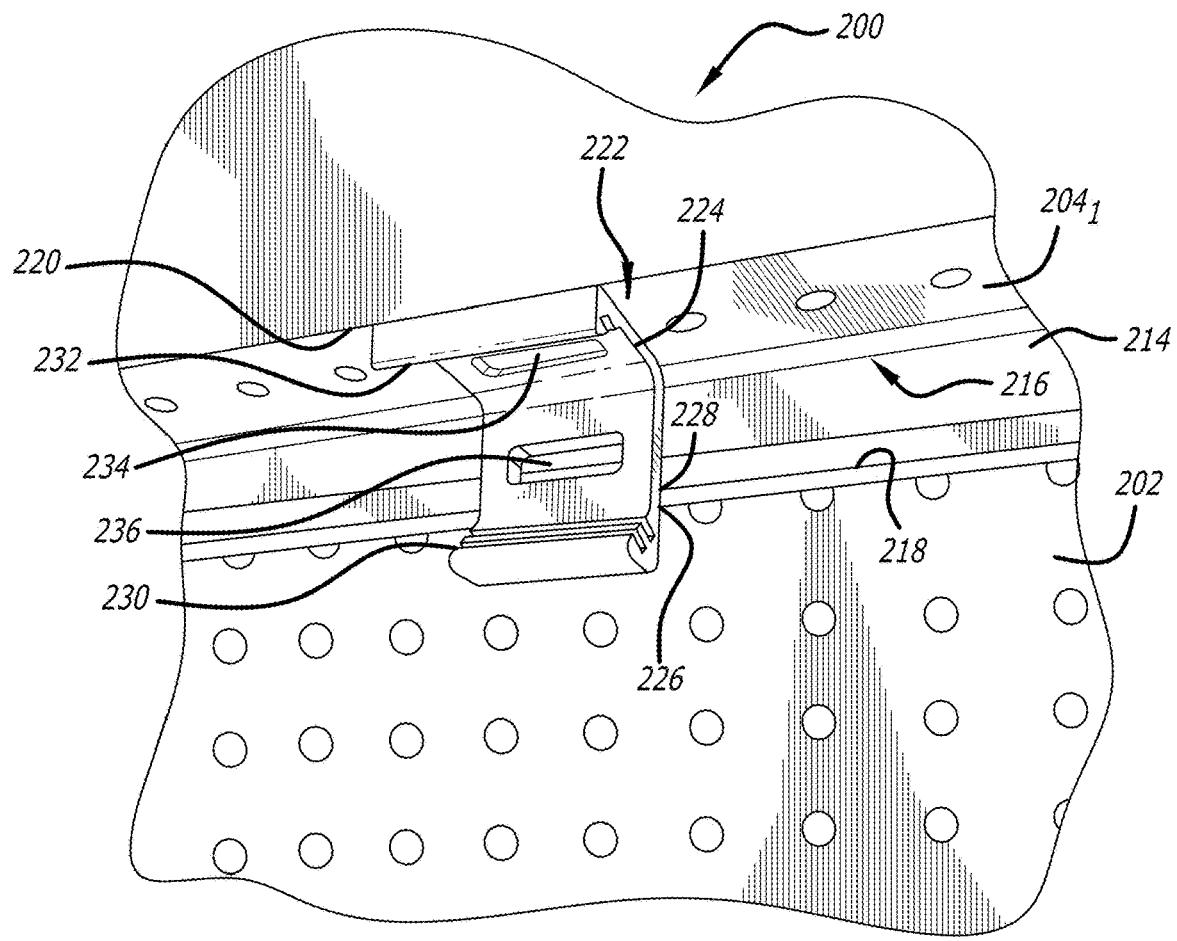
FIG. 2B provides an illustration of a mount of the inventory camera of FIG. 2A in accordance with some embodiments.

Referring to FIG. 2A, a second illustration of a plurality of shelves with an automated inventory intelligence system in accordance with some embodiments is shown. Specifically, FIG. 2A illustrates the automated inventory intelligence system 206 coupled to a shelving unit 200. More particularly, the shelving unit 200 includes a back component 202 (e.g., pegboard) and shelves 204 (wherein shelves 204$_1$-204$_3$ are illustrated; however, the shelving unit 200 may include additional shelves). In the illustrated embodiment, the automated inventory intelligence system 206 includes fascia 208 and the inventory sensor 210 (herein the inventory sensor 210 is depicted as inventory camera). Although only a single inventory camera 210 is shown in FIG. 2A, the automated inventory intelligence system 206 may include additional inventory cameras not shown. FIG. 2A provides a clear perspective as to the positioning of the inventory camera 210 may be in one embodiment. Specifically, the inventory camera 210 is shown to be coupled to a corner formed by an underside of the shelf 204$_1$ and the back component 202. The positioning of the inventory camera 210 can enable the inventory camera 210 to monitor the inventory 212. Additional detail of the coupling of the inventory camera 210 to the shelving unit 200 is seen in FIG. 2B. In addition, the fascia, e.g., fascia 208$_2$ may display pricing information (as also shown in FIG. 1) as well as display an alert, e.g., a visual indicator via LEDs of a portion of the fascia, indicating that inventory stocked on the corresponding shelf, e.g., the shelf 208$_2$, is to be restocked.

Referring now to FIG. 2B, an illustration of a mount of the inventory camera 210 of FIG. 2A is shown in accordance with some embodiments. The mount 222, which may be "L-shaped" in nature (i.e., two sides extending at a 90° (degree) angle from each other, is shown without the inventory camera 210 placed therein. In some embodiments, the inventory camera 210 may snap into the mount 222, which may enable inventory cameras to be easily replaced, moved, removed for charging or repair, etc. The mount 222 is shown as being coupled to a corner formed by an underside of the shelf 204$_1$ and the back component 202. In particular, the shelving unit 200 depicted in FIG. 2B comprises a first metal runner 214 is attached to the back component 202 and a second metal runner 220 is shown as being attached to the underside of the shelf 204$_1$. The first metal runner 214 includes a first groove 216 and a second groove 218 to which flanges of the mount 222, such as the flange 228, may slide or otherwise couple. Although not shown, a groove is also formed by the second metal runner 220, which may also assist in the coupling of the mount 222.

In the embodiment illustrated, the mount 222 includes a top component 224, a side component 226, an optional flange 228, bottom grips 230, top grips 232, a top cavity 234 and side cavity 236. In addition, although not shown, a flange extending from the top component 224 to couple with the metal runner 220 may be included. The inventory camera 210 may couple to the mount 222 and be securely held in place by the bottom grips 230 and the top grips 232. Further, the body of the inventory camera 210 may include projections that couple, e.g., mate, with the cavity 234 and/or the cavity 236 to prevent shifting of the inventory camera 210 upon coupling with the mount 222.

Figure 2C:
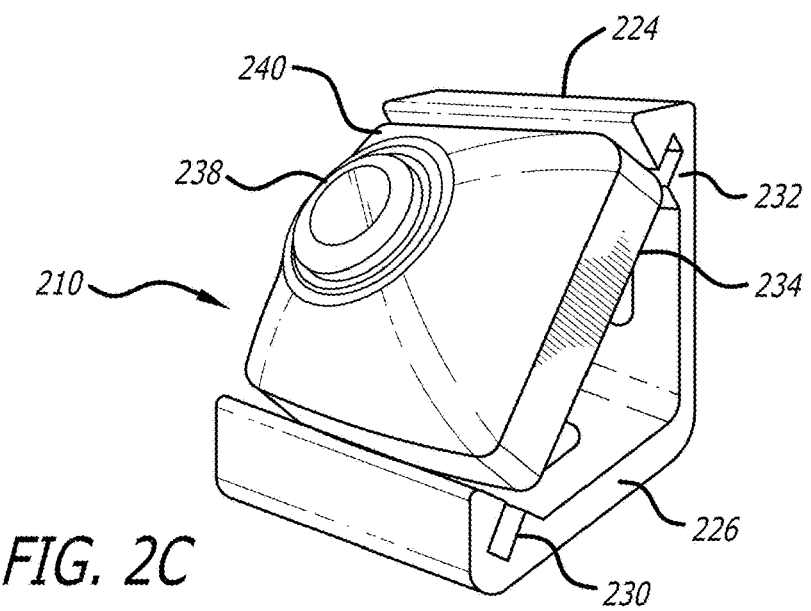
FIG. 2C provides an illustration of the inventory camera positioned within the mount of the automated inventory intelligence system of FIGS. 2A-2B.

Referring to FIG. 2C, an illustration of the inventory camera 210 positioned within the mount 222 of the automated inventory intelligence system 206 of FIGS. 2A-2B is shown. The inventory camera 210 is positioned within the mount 222 and includes a lens 238 and a housing 240. The inventory camera 210 is shown as having four straight sides but may take alternative forms as still be within the scope of the invention. For example, in other embodiments, the inventory camera 210 may only have two straight sides and may include two curved sides. Additionally, the inventory camera 210 may take a circular shape or include one or more circular arcs. Further, the inventory camera 210 may take the form of any polygon or other known geometric shape. In addition, the housing 240 may have an angled face such that the face of the housing 240 slopes away from the lens 238, which may be advantageous in capturing an image having a viewing angle of 180°. The inventory camera 210 may snap into the mount 222 and held in place by friction of the bottom grips 230 and top grips 232, and the force applied by the top component 224 and the side component 226. It would be understood to those skilled in the art that the mount 222 can comprise a variety of shapes depending on the camera and shelving unit 200 being utilized, as can be shown in the camera mount depicted in FIG. 3 below.

Figure 3:
FIG. 3 provides a second illustration of a plurality of shelves with an automated inventory intelligence system in accordance with some embodiments.

Referring now to FIG. 3, a second illustration of a plurality of shelves with an automated inventory intelligence system is shown in accordance with some embodiments. In particular, FIG. 3 illustrates an inventory camera 310$_1$ of the automated inventory intelligence system 300 coupled to the underside of a shelf 304$_1$, which is part of the shelving unit 302. In the embodiment depicted in FIG. 3, the automated inventory intelligence system 300 includes the fascia 306$_1$-306$_2$, the camera 310$_1$ and a mount 314. In one embodiment, the mount 314 is coupled to underside of shelf 304$_1$, which is possible due to the configuration of the shelf 304$_1$, particularly, the shelf 304$_1$ is comprised of a series of grates. Due to the grated nature of the shelf 304$_1$, the mount 314 may be configured to clip directly to one or more of the grates.

It should also be noted that the shelving unit 302 is refrigerated, e.g., configured for housing milk, and includes a door, not shown. As a result of being refrigerated, the shelving unit 302 experiences temperature swings as the door is opened and closed, which often results in the temporary accumulation of condensation on the lens of the inventory camera 310$_1$. Thus, the logic of the automated inventory intelligence system may perform various forms of processing for handling the temporary accumulation of condensation on the lens of the inventory camera 310$_1$, which may include, for example, (i) sensing when the door of the shelving unit 302 is opened, e.g., via sensing activation of a light, and waiting a predetermined amount of time before taking an image capture with the inventory camera 310$_1$ (e.g., to wait until the condensation has dissipated), and/or (ii) capturing an image with the inventory camera 310$_1$, performing image processing such as object recognition techniques, and discarding the image when the object recognition techniques do not provide a confidence level of the recognized objects above a predetermined threshold (e.g., condensation blurred or otherwise obscured the image, indicating the presence of condensation).

Although not shown, in one embodiment, the inventory camera 310$_1$ may be coupled to the front of the shelf 304$_1$ and face the inventory 312. Such an embodiment may be advantageous with refrigerated shelving units such as the shelving unit 302 when a light source, not shown, is housed within the shelving unit and turns on when a door of the shelving unit is opened. More specifically, when the light source is positioned at the rear of the shelving unit, the image captured by the inventory camera 310$_1$ may appear clearer and less blurred in such an embodiment.

Figure 4:
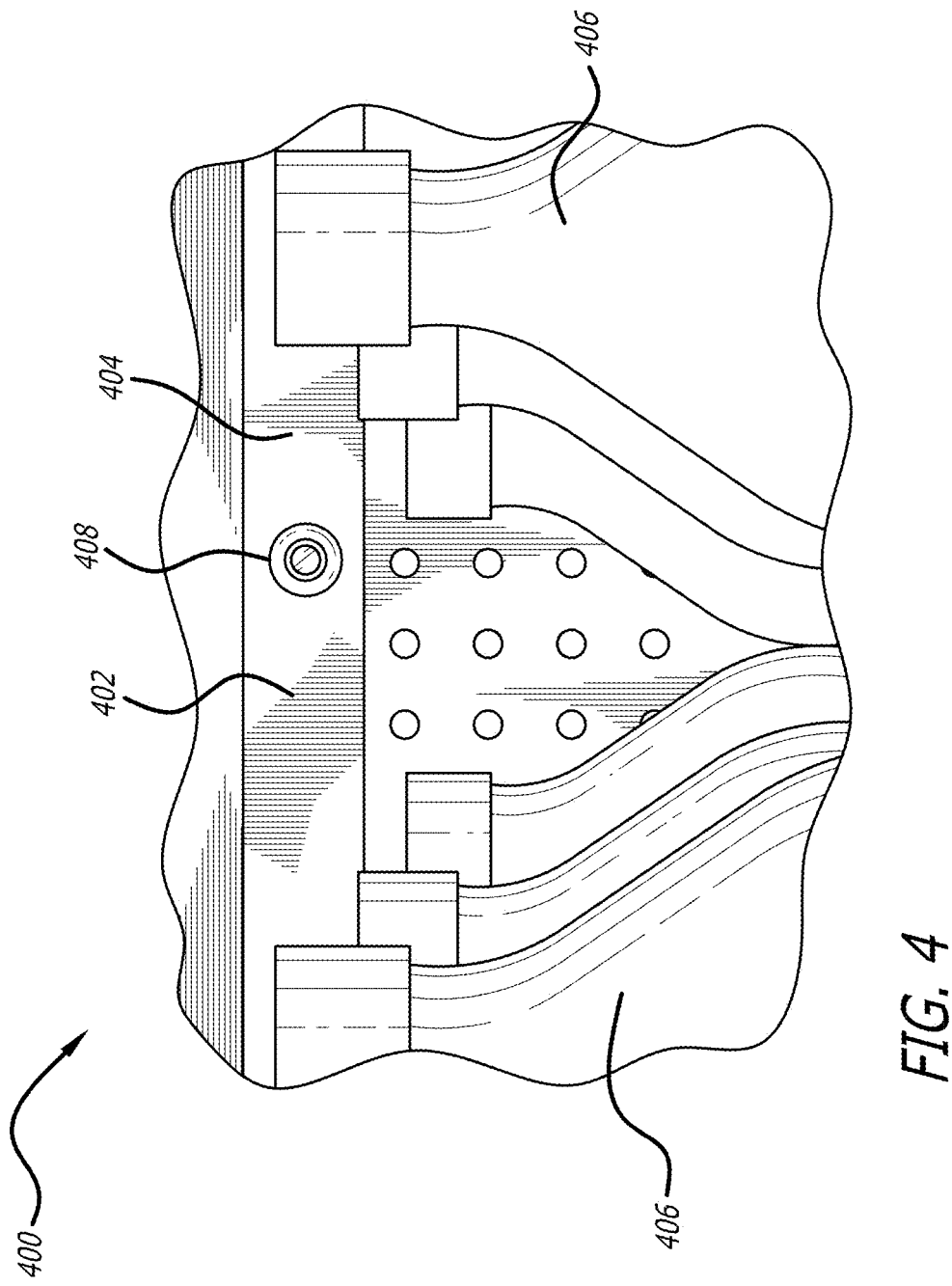
FIG. 4 provides an illustration of a portion of an automated inventory intelligence system in accordance with some embodiments.
Figure 6B:
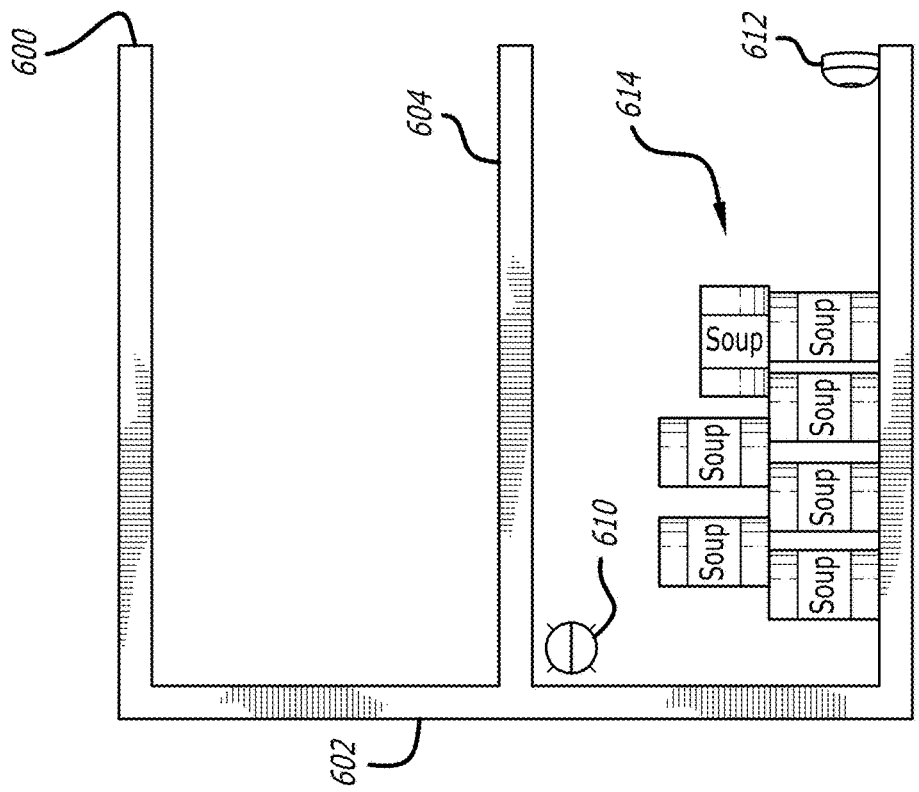
FIG. 6B provides a schematic illustrating a sensor such as an inventory camera coupled to an automated inventory intelligence system in accordance with some embodiments.
Figure 6A:
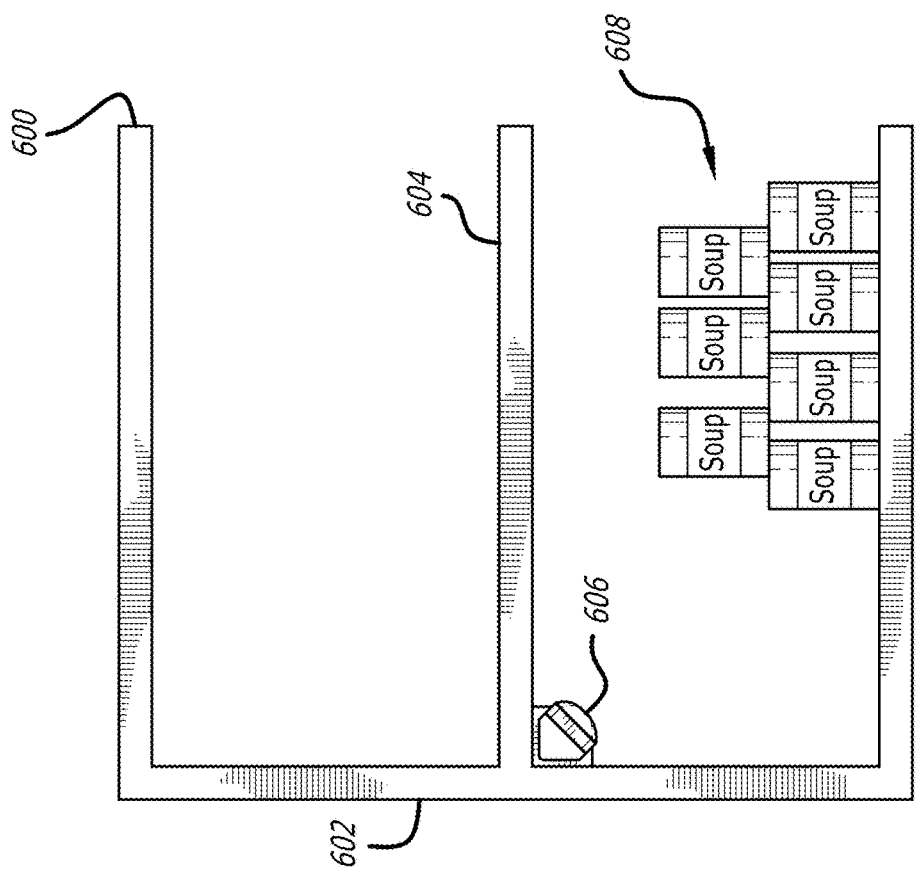
FIG. 6A provides a schematic illustrating a sensor coupled to a retail shelving unit in accordance with some embodiments in shown.

Referring to FIG. 4, an illustration of a portion of an automated inventory intelligence system is shown in accordance with some embodiments. In particular, a sensor 408 is shown positioned near merchandise 406 stocked on a shelving unit 402 of an automated inventory intelligence system 400. The sensor 408 is shown integrated in a housing 404, wherein the housing 404 may, in one embodiment, take the form of a rod that extends along at least a portion of the back component of the shelving unit and may be configured to couple to the shelving unit. As in other embodiments disclosed herein, the sensor 408 may include a digital camera; however, in other embodiments, the sensor 408 may be any sensing device whereby merchandise stocked on a shelving unit may be monitored. In the embodiment shown, the sensor 408 is configured to be coupled directly to the shelving unit 402 by way of any fastening means deemed suitable, such as, by way of non-limiting example, magnets, adhesives, brackets, hardware fasteners, and the like. In other embodiments, such as those illustrated in FIGS. 5-6 below, the sensor 408 may be coupled to the shelving unit 402 through a mounting bracket 506. Further, the location of a sensor such as the sensor 408 is not to be limited to the location shown in FIG. 4. It should be understood that the sensor 408 may be disposed in any location with respect to a retail display or warehouse storage unit whereby the stocked merchandise may be monitored. Embodiments of some alternative positioning of sensors are illustrated in FIGS. 6A-6C. Furthermore, preferred locations suited to receive the sensor 408 will generally depend upon one or more factors, such as, for example, the type of merchandise, an ability to capture a desired quantity of merchandise within the field of view of the sensor 408, as well as the methods whereby customers typically remove merchandise from the retail display units.

Any of the retail displays or warehouse storage units outfitted with the automated inventory intelligence system 400 can monitor the quantity of stocked merchandise by way of one or more sensors such as the sensor 408 and then create a notification or an alert once the remaining merchandise is reduced to a predetermined minimum threshold quantity. For example, low-inventory alerts may be created when the remaining merchandise is reduced to 50% and 20% thresholds; however, the disclosure is not intended to be so limited and thresholds may be predetermined and/or dynamically configurable (e.g., in response to weather conditions, and/or past sales history data). The low-inventory alerts may be sent to in-store staff to signal that a retail display needs to be restocked with merchandise. In some embodiments, the low-inventory alerts can include real-time images and/or stock levels of the retail displays so that staff can see the quantity of merchandise remaining on the retail displays by way of a computer or a mobile device. In some embodiments, the low-inventory alerts may be sent in the form of text messages in real time to mobile devices carried by in-store staff. As will be appreciated, the low-inventory alerts can signal in-store staff to restock the retail displays with additional merchandise to maintain a frictionless shopping experience for consumers. In addition, with the automated inventory intelligence system 400 can facilitate deeper analyses of sales performance by coupling actual sales with display shelf activity.

III. Inventory Monitoring

Referring to FIG. 5, an illustration of an image captured by a camera of an automated inventory intelligence system is shown in accordance with some embodiments. The image 500 shown in FIG. 5 illustrates the ability of an inventory camera configured for use with the automated inventory intelligence system 206 of FIGS. 2A-2C to capture the image 500 having an approximately 180° viewing angle. In certain embodiments, an inventory camera, such as the inventory camera $310_1$ of FIG. 3, may be positioned within a shelving unit, such as the shelving unit 302 of FIG. 3, such that the inventory camera is located at the inner rear of the shelving unit and above a portion of inventory. In such an embodiment, the inventory camera $310_1$ may capture an image such as the image 500, which includes a capture of an inventory portion 508 and an inventory portion 510 stocked on shelving 506. In addition, the image 500 may include a capture of a portion of the store environment 502 and additional inventory 512.

Specifically, the positioning of the inventory camera as shown in FIG. 5 enables the inventory camera to capture images such as the image 500, which may be analyzed by logic of the automated inventory intelligence system 206 to automatically and intelligently determine the amount of inventory stocked on the shelf. For example, as seen in the image 500, the first inventory portion 508 and the second inventory portion 510 may be identified by the automated inventory intelligence system 206 using object recognition techniques. For example, upon recognition of the first inventory portion 508 (e.g., recognition of Pepsi bottles), logic of the automated inventory intelligence system 206 may analyze the quantity remaining on the shelf 506. In additional embodiments, the automated inventory intelligence system 206 may determine whether a threshold number of bottles have been removed from the shelf 506. Upon determining at least the threshold number of bottles have been removed, the automated inventory intelligence system 206 may generate a report and/or an alert notifying employees and/or manufacturer that the inventory portion 508 requires restocking. In additional embodiments, the automated inventory intelligence system 206 may determine that less than a threshold number of bottles remain on the shelf 506 and therefore the first inventory portion 508 requires restocking. Utilization of other methodologies of determining whether at least a predetermined number of items remain on a shelf for a given inventory set are within the scope of the invention. Herein, the term "inventory set" generally refers to a grouping of a particular item, e.g., a grouping of a particular type of merchandise, which may include brand, product size (12 oz. bottle v. 2 L bottle), etc.

In some embodiments, the image 500 may also be analyzed to determine the remaining items of other inventory portions such as the second inventory portion 510 and/or the alternative portion 512. As seen in FIGS. 6A-6C, the inventory camera may be placed at various varying positions within, or coupled to, a shelving unit. The utilization of such alternative configurations may be dependent upon the type of shelving unit, the type of inventory being captured in images taken by the inventory camera and/or the positioning of inventory within the store environment (e.g., across an aisle).

FIGS. 6A-6C provide schematics illustrating sensors coupled to retail displays in accordance with some embodiments. The one or more sensors are configured to be disposed in a retail environment such as by coupling the sensors to retail displays or warehouse storage units. Such retail displays include, but are not limited to, shelves, panels (e.g., pegboard, gridwall, slatwall, etc.), tables, cabinets, cases, bins, boxes, stands, and racks, and such warehouse storage includes, but is not limited to, shelves, cabinets, bins, boxes, and racks. The sensors may be coupled to the retail displays or the warehouse storage units such that one sensor is provided for every set of inventory items (e.g., one-to-one relationship), one sensor for a number of sets of inventory items (e.g., one-to-many relationship), or a combination thereof. The sensors may also be coupled to the retail displays or the warehouse storage units with more than one sensor for every set of inventory items (e.g., many-to-one relationship), more than one sensor for a number of sets of inventory items (e.g., many-to-many relationship), or a combination thereof. In an example of a many-to-one relationship, at least two sensors monitor the same set of inventory items thereby providing contemporaneous sensor data for the set of inventory items. Providing two (or more) sensors for a single set of inventory is useful for sensor data redundancy or simply having a backup. Each of FIGS. 6A-6C shows a one-to-one relationship of a sensor to a set of inventory items, but each sensor can alternatively be in one of the foregoing alternative relationships with one or more sets of inventory items.

The sensors include, but are not limited to, light- or sound-based sensors such as digital cameras and microphones, respectively. In some embodiments, the sensors are digital cameras, also referred to as "inventory cameras," with a wide viewing angle up to a 180° viewing angle.

Referring now to FIG. 6A, a schematic illustrating a sensor such as a sensor 606 coupled to a retail shelving unit 604 is shown in accordance with some embodiments. As shown, the sensor 606, e.g., an inventory camera, may be coupled to or mounted on the retail shelving unit 604 under an upper shelf of the shelving unit 604, wherein the shelving unit 604 is a component of the housing 602 of the automated inventory intelligence system 600. In the illustrated embodiment, the inventory camera 606 is configured in an orientation to view a set of inventory items 608 on an inventory item-containing shelf beneath the upper shelf. While the inventory camera 606 is shown mounted inside the retail shelving unit 604 such as on a back (e.g., pegboard) of the housing 602 and looking out from the automated inventory intelligence system 600, the inventory camera 606 may alternatively be coupled to the upper shelf and looking in to the automated inventory intelligence system 600. Due to a wide viewing angle of up to 180°, whether looking out from or in to the automated inventory intelligence system 600, the inventory camera 606 may collect visual information on sets of inventory items adjacent to the set of inventory items 608.

Referring to FIG. 6B, a schematic illustrating a sensor such as an inventory camera 612 coupled to an automated inventory intelligence system 600 is shown in accordance with some embodiments. As shown, the inventory camera 612 may be coupled to or mounted on the automated inventory intelligence system 600 on an inventory-item containing shelf of the automated inventory intelligence system 600 in an orientation to view a set of inventory items 614 on the inventory item-containing shelf. While the inventory camera 612 is shown mounted inside the automated inventory intelligence system 600 on the inventory item-containing shelf and looking in to the automated inventory intelligence system 600, which may be advantageous when a light 610 is present in a back of automated inventory intelligence system 600, the inventory camera 612 may alternatively be coupled to the inventory item-containing shelf and looking out from the automated inventory intelligence system 600. Due to a wide viewing angle of up to 180°, whether looking in to or out from the automated inventory intelligence system 600, the inventory camera 612 may collect visual information on sets of inventory items adjacent to the set of inventory items 614.

Referring to FIG. 6C, a schematic illustrating a sensor such as an inventory camera 622 coupled to the automated inventory intelligence system 600 is shown in accordance with some embodiments. In addition, FIG. 6C further provides a second housing 618 with a second sensor such as an inventory camera 624 coupled to a second upper shelf 620 and in communication with a second automated inventory intelligence system 616 in accordance with some embodiments. In certain embodiments the automated inventory intelligence system 600 and second automated inventory intelligence system 616 may be separate and independent systems or may be communicatively coupled and/or processing data cooperatively.

As shown, the inventory camera 622 may be physically coupled to or mounted on the automated inventory intelligence system 600 in an orientation to view a set of inventory items 628 on an inventory-item containing shelf of an opposing shelving unit across an aisle such as the automated inventory intelligence system 616. Likewise, the inventory camera 624 may be coupled to or mounted on the automated inventory intelligence system 616 in an orientation to view a set of inventory items 626 on an inventory-item containing shelf of an opposing shelving unit across an aisle such as the automated inventory intelligence system 600. Due to wide viewing angles of up to 180°, the inventory camera 622 can collect visual information on sets of inventory items on the automated inventory intelligence system 616 adjacent to the set of inventory items 628 (not shown), and the inventory camera 622 can collect visual information on sets of inventory items on the automated inventory intelligence system 616 adjacent to the set of inventory items 626 (not shown).

In some embodiments, inventory cameras such as inventory cameras 606, 612, 622, and 624 are coupled to or mounted on endcaps or other vantage points of the automated inventory intelligence systems to collect visual information while looking in to the retail shelving units.

Figure 7A:
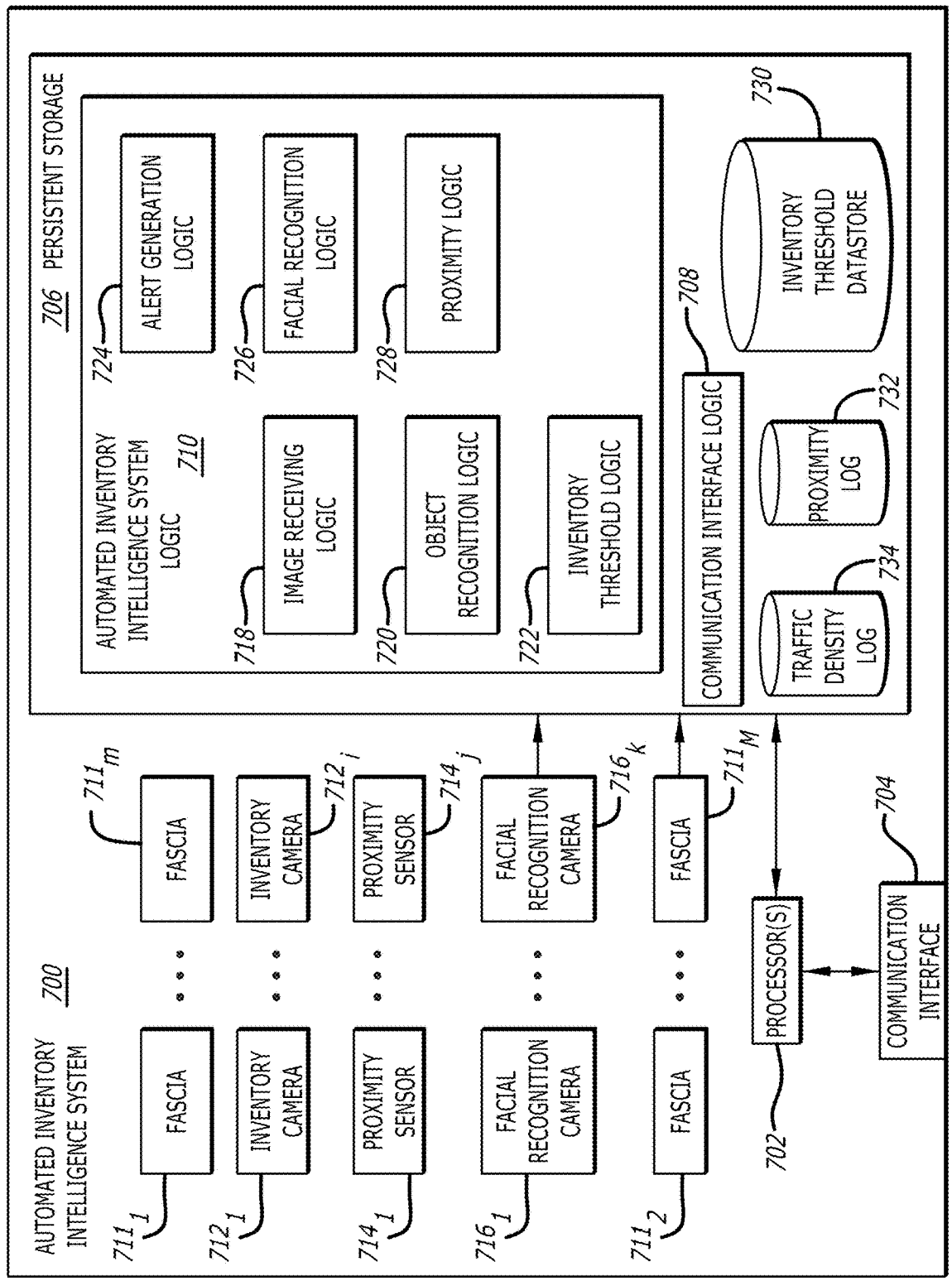
FIG. 7A provides an exemplary embodiment of a first logical representation of the automated inventory intelligence system of FIG. 1.

Referring to FIG. 7A, an exemplary embodiment of a first logical representation of the automated inventory intelligence system of FIG. 1 is shown in accordance with some embodiments. In many embodiments, the automated inventory intelligence system 700, may include one or more processors 702 that are coupled to a communication interface 704. The communication interface 704, in combination with a communication interface logic 708, enables communications with external network devices and/or other network appliances transmit and receive data. According to one embodiment of the disclosure, the communication interface 704 may be implemented as a physical interface including one or more ports for wired connectors. Additionally, or in the alternative, the communication interface 704 may be implemented with one or more radio units for supporting wireless communications with other electronic devices. The communication interface logic 708 may include logic for performing operations of receiving and transmitting data via the communication interface 704 to enable communication between the automated inventory intelligence system 700 and network devices via a network (e.g., the internet) and/or cloud computing services, not shown.

The processor(s) 702 is further coupled to a persistent storage 706. According to one embodiment of the disclosure, the persistent storage 706 may store logic as software modules includes an automated inventory intelligence system logic 710 and the communication interface logic 708. The operations of these software modules, upon execution by the processor(s) 702, are described above. Of course, it is contemplated that some or all of this logic may be implemented as hardware, and if so, such logic could be implemented separately from each other.

Additionally, the automated inventory intelligence system 700 may include hardware components such as fascia $711_1$-$711_m$ (wherein m≥1), inventory cameras $712_1$-$712_i$ (wherein i≥1), proximity sensors $714_1$-$714_j$ (wherein j≥1), and facial recognition cameras $716_1$-$716_k$ (wherein k≥1). For the purpose of clarity, couplings, i.e., communication paths, are not illustrated between the processor(s) 702 and the fascia $711_1$-$711_m$, the inventory cameras $712_1$-$712_i$, the proximity sensors $714_1$-$714_j$, and the facial recognition cameras $716_1$-

$716_k$; however such couplings may be direct or indirect and configured to allow for the provision of instructions from the automated inventory intelligence system logic 710 to such components Each of the inventory cameras $712_1$-$712_i$, the proximity sensors $714_1$-$714_j$, and the facial recognition cameras $716_1$-$716_k$ may be configured to capture images, e.g., at predetermined time intervals or upon a triggering event, and transmit the images to the persistent storage 706. The automated inventory intelligence system logic 710 may, upon execution by the processor(s) 702, perform operations to analyze the images. Specifically, the automated inventory intelligence system logic 710 includes an image receiving logic 718, an object recognition logic 718, an inventory threshold logic 722, an alert generation logic 724, a facial recognition logic 726 and a proximity logic 728. As will be discussed in further detail below with respect to FIGS. 8-9, the image receiving logic 718 can be configured to, upon execution by the processor(s) 702, perform operations to receive a plurality of images from a sensor, such as the inventory cameras $712_1$-$712_i$. In some embodiments, the image receiving logic 718 may receive a trigger, such as a request for a determination as to whether an inventory set needs to be restocked, and request an image be captured by one or more of the inventory cameras $712_1$-$712_i$.

The object recognition logic 720 is configured to, upon execution by the processor(s) 702, perform operations to analyze an image received by an inventory camera $712_1$-$712_i$, including object recognition techniques. In some embodiments, the object recognition techniques may include the use of machine learning, predetermined rule sets and/or deep convolutional neural networks. The object recognition logic 720 may be configured to identify one or more inventory sets within an image and determine an amount of each product within the inventory set. In addition, the object recognition logic 720 may identify a percentage, numerical determination, or other equivalent figure that indicates how much of the inventory set remains on the shelf (i.e., stocked) relative to an initial amount (e.g., based on analysis and comparison with an earlier image and/or retrieval of an initial amount predetermined and stored in a data store, such as the inventory threshold data store 730).

The inventory threshold logic 722 is configured to, upon execution by the processor(s) 702, perform operations to retrieve one or more predetermined thresholds and determine whether the inventory set needs to be restocked. A plurality of predetermined holds, which may be stored in the inventory threshold data store 730, may be utilized in a single embodiment. For example, a first threshold may be used to determine whether the inventory set needs to be stocked and an alert transmitted to, for example, a retail employee (e.g., at least a first amount of the initial inventory set has been removed). In addition, a second threshold may be used to determine whether a product delivery person needs to deliver more of the corresponding product to the retailer (e.g., indicating at least a second amount of the initial inventory set has been removed, the second amount greater than the first amount). In such an embodiment, when the second threshold is met, alerts may be transmitted to both a retail employee and a product delivery person.

The alert generation logic 724 can be configured to, upon execution by the processor(s) 702, perform operations to generate alerts according to determinations made by, for example, the object recognition logic 720 and the inventory threshold 722. In certain embodiments, the alerts may take any form such as a digital communication transmitted to one or more electronic devices, and/or an audio/visual cue in proximity to the shelf on which the inventory set is stocked, etc.

The facial recognition logic 726 may be configured to, upon execution by the processor(s) 702, perform operations to analyze images received by the image receiving logic 718 from the facial recognition cameras $716_1$-$716_k$. In some embodiments, the facial recognition logic 726 may look to determine trends in customers based on ethnicity, age, gender, time of visit, geographic location of the store, etc., and, based on additional analysis, the automated inventory intelligence system logic 710 may determine trends in accordance with graphics displayed by the automated inventory intelligence system 700, sales, time of day, time of the year, day of the week, etc. Facial recognition logic 726 may also be able to generate data relating to the overall traffic associated with the facial recognition cameras $716_1$-$716_k$. This can be generated directly based on the number of faces (unique and non-unique) that are processed within a given time period. This data can be stored within the persistent storage 706 within a traffic density log 734.

The proximity logic 728 can be configured to, upon execution by the processor(s) 702, perform operations to analyze images received by, for example, the image receiving logic 718 from the proximity sensors $714_1$-$714_j$. In some embodiments, the proximity logic 728 may determine when a customer is within a particular distance threshold from the shelving unit on which the inventory set is stocked and transmit a communication (e.g., instruction or command) to the change the graphics displayed on the fascia, e.g., such as the fascia $711_1$-$711_m$. Data related to the proximity, and therefore the potential effectiveness of an advertisement, may be stored within a proximity log 732. In this way, data may be provided that can be tracked with particular displays, products, and/or advertising campaigns.

Figure 7B:
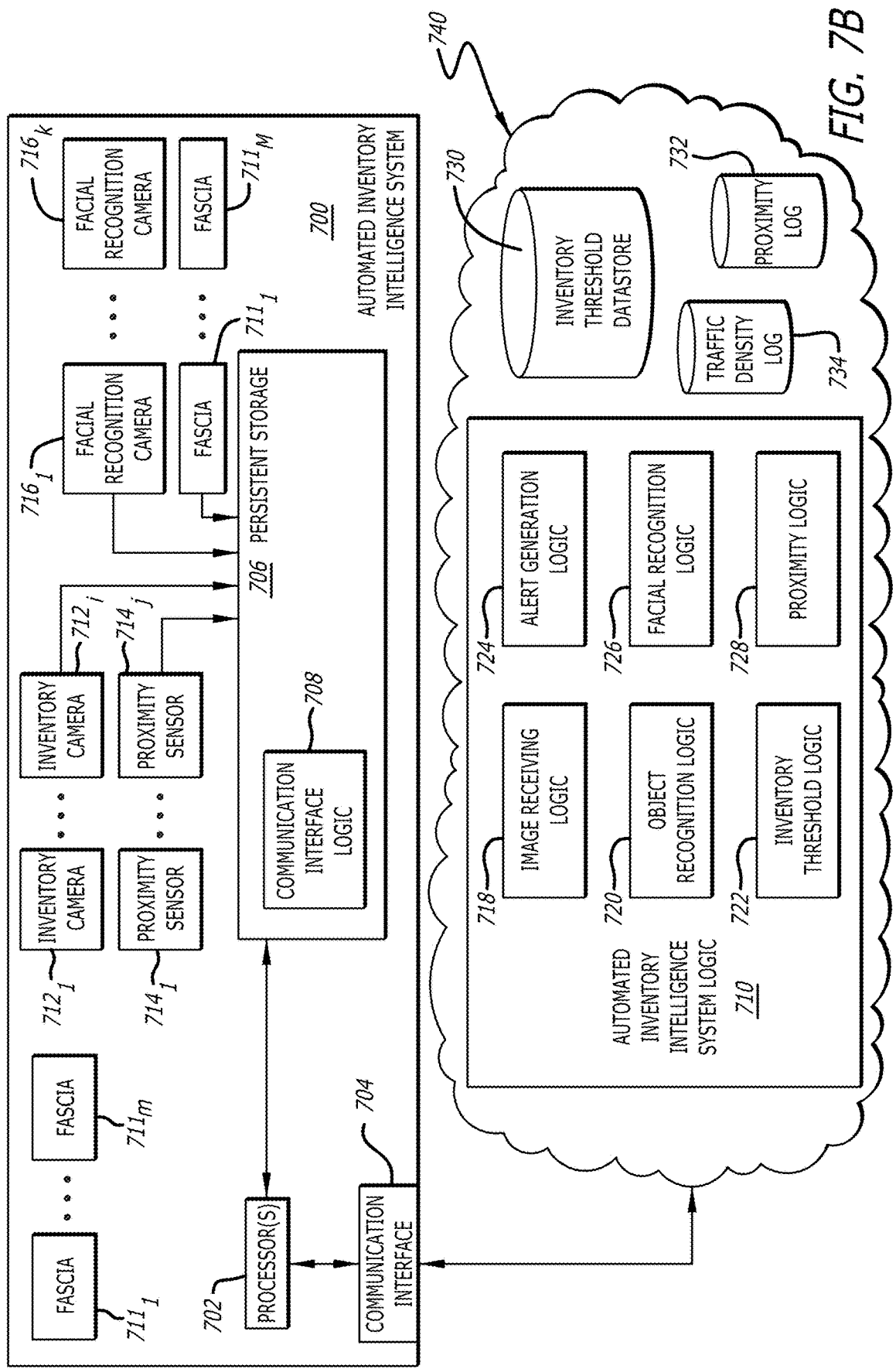
FIG. 7B provides an exemplary embodiment of a second logical representation of the automated inventory intelligence system of FIG. 1.

Referring to FIG. 7B, an exemplary embodiment of a second logical representation of the automated inventory intelligence system of FIG. 1 is shown in accordance with some embodiments. The illustration of FIG. 7B provides a second embodiment of the automated inventory intelligence system 700 in which the automated inventory intelligence system logic 710 of FIG. 7A resides in cloud computing services 740. In such an embodiment, each of the fascia $711_1$-$711_m$, the inventory cameras $712_1$-$712_i$, the proximity sensors $714_1$-$714_j$, and the facial recognition cameras $716_1$-$716_k$ may be configured to capture images which are then transmitted, via the communication interface 704, to the automated inventory intelligence system 710 in the cloud computing services 740. The automated inventory intelligence system 710, upon execution via the cloud computing services 740, perform operations to analyze the images.

Processor(s) 702 can represent a single processor or multiple processors with a single processor core or multiple processor cores included therein. Processor(s) 702 can represent one or more general-purpose processors such as a microprocessor, a central processing unit ("CPU"), or the like. More particularly, processor(s) 702 may be a complex instruction set computing ("CISC") microprocessor, reduced instruction set computing ("RISC") microprocessor, very long instruction word ("VLIW") microprocessor, or processor implementing other instruction sets, or processors implementing a combination of instruction sets. Processor(s) 702 can also be one or more special-purpose processors such as an application specific integrated circuit ("ASIC"), a field programmable gate array ("FPGA"), a digital signal processor ("DSP"), a network processor, a graphics processor, a network processor, a communications processor, a cryptographic processor, a co-processor, an embedded processor, or any other type of logic capable of processing instructions. Processor(s) 702 can be configured to execute instructions for performing the operations and steps discussed herein.

Persistent storage 706 can include one or more volatile storage (or memory) devices, such as random access memory ("RAM"), dynamic RAM ("DRAM"), synchronous DRAM ("SDRAM"), static RAM ("SRAM"), or other types of storage devices. Persistent storage 706 can store information including sequences of instructions that are executed by the processor(s) 702, or any other device. For example, executable code and/or data of a variety of operating systems, device drivers, firmware (e.g., input output basic system or BIOS), and/or applications may be loaded in persistent storage 706 and executed by the processor(s) 702. An operating system may be any kind of operating systems, such as, for example, Windows® operating system from Microsoft®, Mac OS®/iOS® from Apple, Android® from Google®, Linux®, Unix®, or other real-time or embedded operating systems such as VxWorks.

Some portions of the description provided herein have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it should be appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The techniques shown in the figures may be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the figures may be performed by processing logic that includes hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

IV. Inventory Monitoring Methodology

Figure 8:
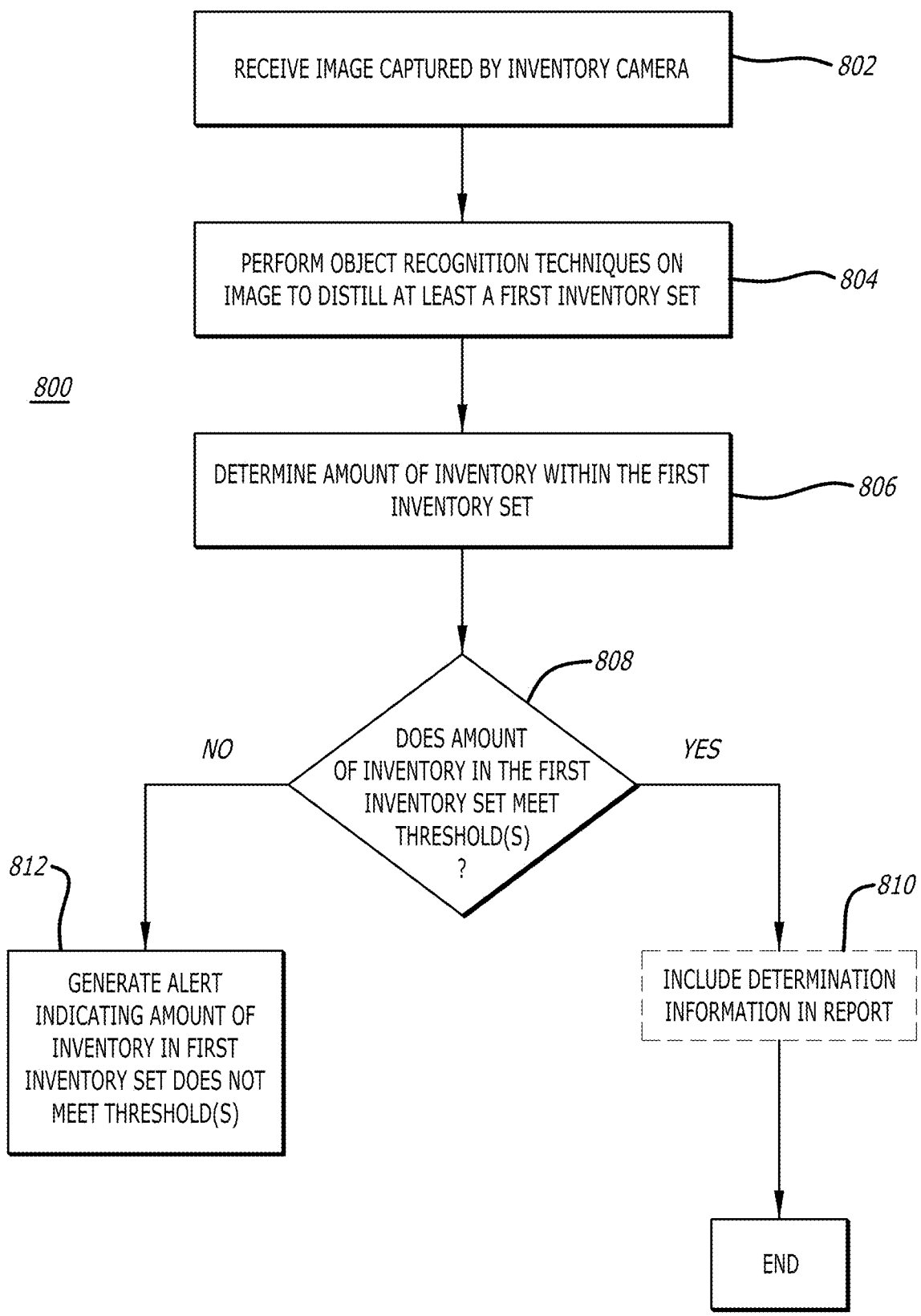
FIG. 8 provides a flowchart illustrating an exemplary method for analyzing, by the automated inventory intelligence system logic of FIGS. 7A-7B, an image of inventory to determine whether the inventory is to be restocked in accordance with some embodiments.

Referring now to FIG. 8 with additional reference to FIGS. 7A-7B, a flowchart illustrating an exemplary method for analyzing, by the automated inventory intelligence system logic 710 of FIGS. 7A-7B, an image of inventory to determine whether the inventory is to be restocked is shown in accordance with some embodiments. Each block illustrated in FIG. 8 represents an operation performed in the method 800 of analyzing an image of inventory to determine whether the inventory is to be restocked. Herein, the method 800 starts when the image receiving logic 718 of the automated inventory intelligence system logic 710 receives an image captured by an inventory camera, e.g., the inventory camera $712_1$ (block 802).

Upon receiving the image, the object recognition logic 720 of the automated inventory intelligence system logic 710 performs processing on the image including one or more object recognition techniques to distill at least a first inventory set (block 804). For example, the object recognition logic 720 may perform operations including, but not limited or restricted to, identification of objects of interest within the image, quantification of objects of interest within the image, depth determination of object of interest within the image, and/or pattern recognition of at least portions of items of interest within the image in order to differentiate inventory sets. For example, as illustrated in FIG. 5, the object recognition logic 720 may distill at least two inventory sets from the image 500 including the first inventory portion 508 and second inventory portion 510. The object recognition techniques may utilize deep convolutional neural networks, machine learning techniques and/or predetermined rule sets. Object recognition techniques may also be referred to as image recognition and/or computer vision.

Following the performance of the object recognition techniques and the distilling of at least the first inventory set, object recognition logic 720 determines the amount of inventory within the first inventory set (block 806). As discussed in further detail below with respect to thresholds, the amount of inventory may refer to a specific number of items (e.g., 16 2 L soda bottles remain) or a percentage/ratio (e.g., 50% of the 2 L soda bottles remain or ½ of the 2 L soda bottles remain). As discussed below, the number of items initially stocked may be predetermined and stored in the inventory threshold data store 730. Additionally, or in the alternative, the object recognition logic 720 may determine or estimate the number of items to fill the shelf space provided for the first inventory set (e.g., estimate the shelf space based on the location of the first inventory set relative to the edges of the shelf and other inventory sets also located on the shelf).

Subsequent to the determination of the amount of inventory within the first inventory set, the inventory threshold logic 722 can determine whether the amount of inventory set meets a predetermined threshold (block 808). In certain embodiments, the thresholds may be stored in and retrieved from the inventory threshold data store 730. In some embodiments, a single predetermined threshold may be utilized for all inventory sets, e.g., a percentage of inventory remaining on the shelf. In one embodiment, the object recognition logic 720 may determine the percentage of inventory remaining by retrieving a predetermined number representing the initial inventory (e.g., a number items initially stocked) and determining the ratio between the initial inventory and the current inventory. Such a predetermined number may also be stored in the inventory threshold data store 730 and stored according to the inventory set and the retailer or retail location (as one retailer may not have the same amount of space to stock the inventory set as a second retailer). The predetermined number may be dynamically adjustable by, for example, a retail employee when the inventory set is restocked and/or the inventory set is moved from a first location to a second location.

In other embodiments, a predetermined threshold (e.g., either a percentage or a number) may be stored for one or more inventory sets. For example, a first threshold may correspond to a first inventory set, such as 2 L bottles of a first soda, and a second threshold (different than the first threshold) may correspond to a second inventory set, such as 12 oz. bottles of the first soda. Additionally, thresholds may be dynamically adjusted for various reasons including, but not limited to, sale prices, local stock levels, sales history, promotional campaigns, etc.

When the inventory threshold logic 722 determines that the amount of inventory of the first inventory set meets or exceeds the predetermined threshold (yes at block 808), the alert generation logic 724 may optionally generate a report, or add information to an existing report (such as a log), indicating that a determination was made that the first inventory set did not need to be restocked (block 810). For example, one or more of the following may be included in a log: a time stamp, an indication or identifier of the inventory camera that captured the image, the image, an indication or identifier of the first inventory set (as well as other inventory sets recognized), an indication of the determination not to restock, etc.

When the inventory threshold logic 722 determines that the amount of inventory of the first inventory set does not at least meet the predetermined threshold (no at block 808), the alert generation logic 724 may generate an alert (and/or a report) indicating that the first inventory set is to be restocked (block 812). The alert may take many forms including, but not limited or restricted to, a text message, an email, or any other digitally transmitted audio/visual indication (e.g., message transmitted via Bluetooth®). Additionally, or in the alternative, the alert may include a visual indication located proximate to the shelf on which the first inventory set is stocked (e.g., a light on or near the relevant shelf or a light on the corresponding cabinet display top). The alert may include information such as an identifier of the first inventory set, an indicator identifying the location of the first inventory set within the retailer or retail location (e.g., a map of the retailer's space and an indicator of the relevant shelf on the map or an aisle number), an amount of inventory to restock (e.g., a particular number or percentage, the determination of which is discussed above), the image of the first inventory set, etc. The alert may be transmitted to one or more of: an electronic device at the retailer or retail location (e.g., a dedicated tablet in the back of the retailer), an electronic device of a specific employee, an electronic device of a distributor/product delivery person, etc. In some embodiments, the determination of what information to include and to what electronic devices to transmit the alert may be based on a predetermined rule set (which may also be stored in the inventory threshold data store 730). For example, the predetermined rule set may include a set of thresholds such that a first, lower threshold indicates an alert is to be sent to a retail employee, while a second, higher threshold indicates the alert is also to be sent to a distributor/product delivery person (i.e., when inventory is very low, send alert to distributor/product delivery person). In some embodiments, the alert generation logic 724 may access a data store, not shown, which includes information as to the total amount of the product comprising the first inventory set at a particular retailer or retail location (e.g., amount of the product stocked and also located in the back of the retailer or retail location, which may be dynamically updated in real-time based on product sales information obtained when a customer makes a purchase).

Figure 9:
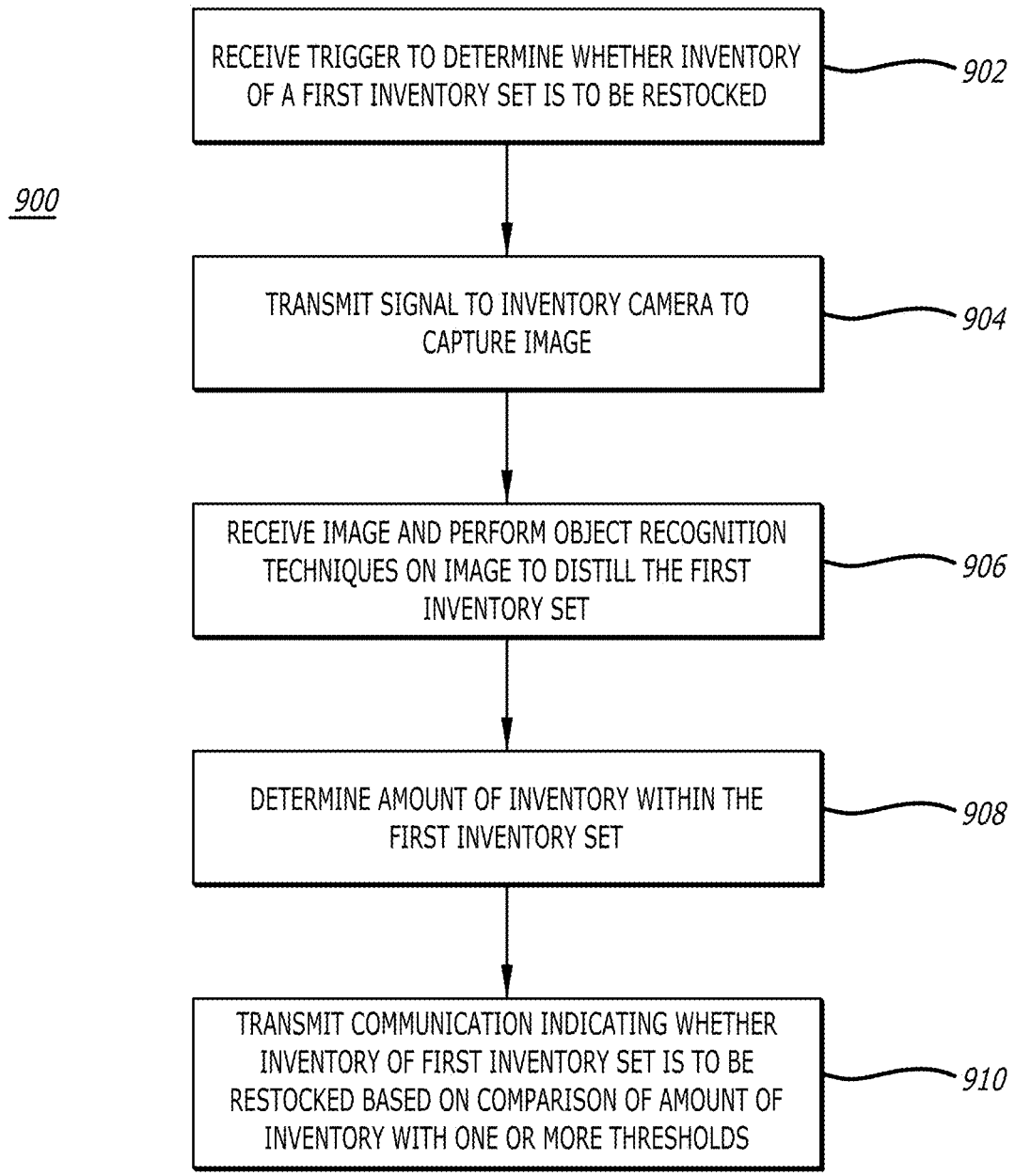
FIG. 9 provides a flowchart illustrating an exemplary method for analyzing, by the automated inventory intelligence system logic of FIGS. 7A-7B, an image of inventory to determine whether the inventory is to be restocked based on a triggering event in accordance with some embodiments.

Referring now to FIG. 9, a flowchart illustrating an exemplary method for analyzing, by the automated inventory intelligence system logic of FIGS. 7A-7B, an image of inventory to determine whether the inventory is to be restocked based on a triggering event is shown in accordance with some embodiments. Each block illustrated in FIG. 9 represents an operation performed in the method 900 of analyzing an image of inventory to determine whether the inventory is to be restocked based on a triggering event. Herein, in accordance with certain embodiments, the method 900 can start when the image receiving logic 718 of the automated inventory intelligence system logic 710 receives a trigger to determine whether inventory of a first inventory set is to be restocked (block 902). A trigger may take various including a communication from a proximity sensors $714_1$-$714_j$, from a facial recognition camera $716_1$-$716_k$, a retail employee and/or a product delivery person. In addition, a trigger be received automatically at predetermined intervals (e.g., a pull system such that the inventory cameras $712_1$-$712_i$ are activated upon an instruction from the image receiving logic 718).

In response to receiving a trigger, the image receiving logic 718 can transmit a signal or other communication to an inventory camera $712_1$-$712_i$ monitoring the first inventory set identified in the trigger (e.g., the inventory configured to capture an image of the first inventory set) (block 904). The image receiving logic 718 may determine one or more inventory cameras of the inventory cameras $712_1$-$712_i$ that are to capture an image. In one embodiment, the received trigger include have an indication of a particular inventory set (e.g., 2 L bottles of a first soda). The image receiving logic 718 may determine the location of the particular inventory set in the retail location and determine the inventory camera $712_1$-$712_i$ that is configured/positioned to capture an image of the identified location. For example, a data store of the automated inventory intelligence system 700, not shown, may be configured to store data indicating pairings of: {inventory set, retail location}. Based on the stored pairing, which may be dynamically adjustable based on restocking of shelves, the image receiving logic 718 may determine the retail location of the inventory. In addition, the data store may also be configured to store pairings of: {retail location, inventory camera}. Therefore, based on the determined retail location, the image receiving logic 718 may determine the inventory camera $712_1$-$712_i$ that is positioned to capture an image of the retail location at which the particular inventory set is stocked. Based on this determination, the image receiving logic 718 may transmit a signal to the identified inventory camera with the instruction to capture an image.

Subsequent to the transmission of the signal to the relevant inventory camera, the image receiving logic 718 can receive an imaged captured by the relevant inventory camera (block 906). Following the receipt of the image, the automated inventory intelligence system logic 710 determines an amount of inventory within the first inventory set as discussed in FIG. 8 (block 908). Further, the automated inventory intelligence system logic 710 transmits a communication indicating whether inventory of the first inventory set is to be restocked based on a comparison of the amount of inventory of the first inventory set remaining with one or more inventory thresholds as discussed in FIG. 8 (block 910).

V. Proximity Sensor a. Proximity Sensor Architecture

Figure 10:
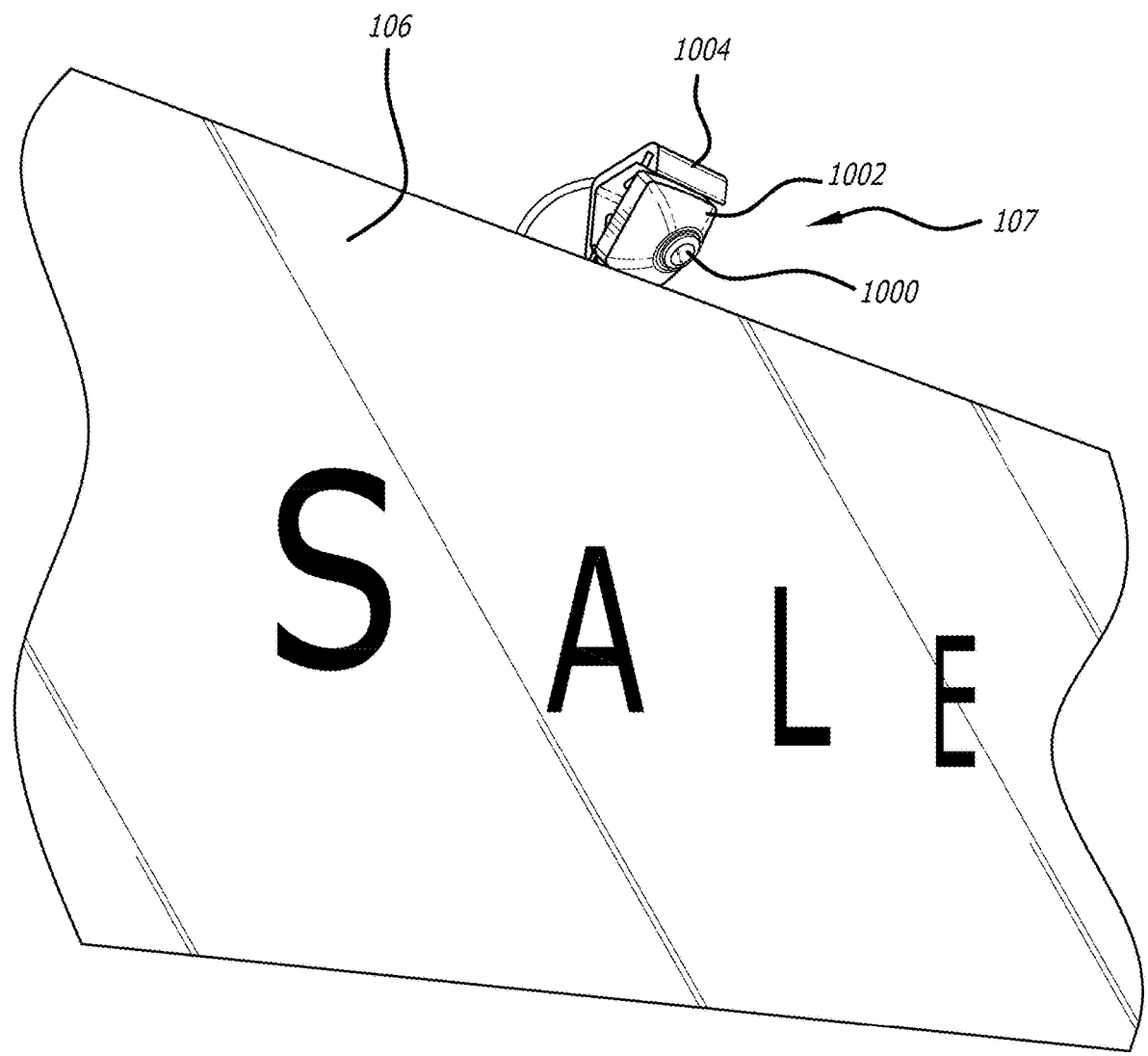
FIG. 10 provides an exemplary embodiment of the proximity sensor positioned on a cabinet display top of the automated inventory intelligence system of FIG. 1 in accordance with some embodiments.

Referring now to FIG. 10, an exemplary embodiment of the proximity sensor positioned on a cabinet display top of the automated inventory intelligence system of FIG. 1 is shown in accordance with some embodiments. In particular, FIG. 10 illustrates one embodiment in which the proximity sensor 107 is a camera ("proximity camera 107"); however, the disclosure is not intended to be so limited. Instead, the proximity sensor 107 may be any sensor configured to detect objects within a predetermined proximity region, e.g., without any physical contact with the objects. For example, a proximity region may be a geo-fence, e.g., a virtual perimeter for a geographical area. Examples of alternative proximity sensors may include, but are not limited or restricted to, electromagnetic sensors, infrared sensors, and optical sensors. In addition, in certain embodiments, capacitive proximity sensors, photoelectric proximity sensors, and/or inductive proximity sensors may be used.

The proximity camera 107 of FIG. 10 is configured to couple to the cabinet display top 106 via a mount 1004 and includes a lens 1000 and a housing 1002 of proximity camera. In one embodiment, the proximity camera 107 may be the same camera as the inventory camera 210 as seen in, for example, FIG. 2C, or an equivalent model. In one embodiment, the proximity camera 107 may have a viewing angle of approximately 180° (degrees) and is capable of monitoring a larger portion of the store environment, particularly, the geographic region in front of the shelving unit to which the proximity camera 107 is coupled.

Although illustrated as being positioned on top of the cabinet display top 106, the proximity camera 107 may be coupled to a side or the bottom of the cabinet display top 106. In addition, although not shown, the proximity camera 107 may be integrated directly into the cabinet display top 106. In addition, the proximity camera 107 may be positioned at any location on the cabinet display top 106, e.g., the middle, toward either end, etc.

b. Proximity Region Analysis and Graphic Displays

Figure 11A:
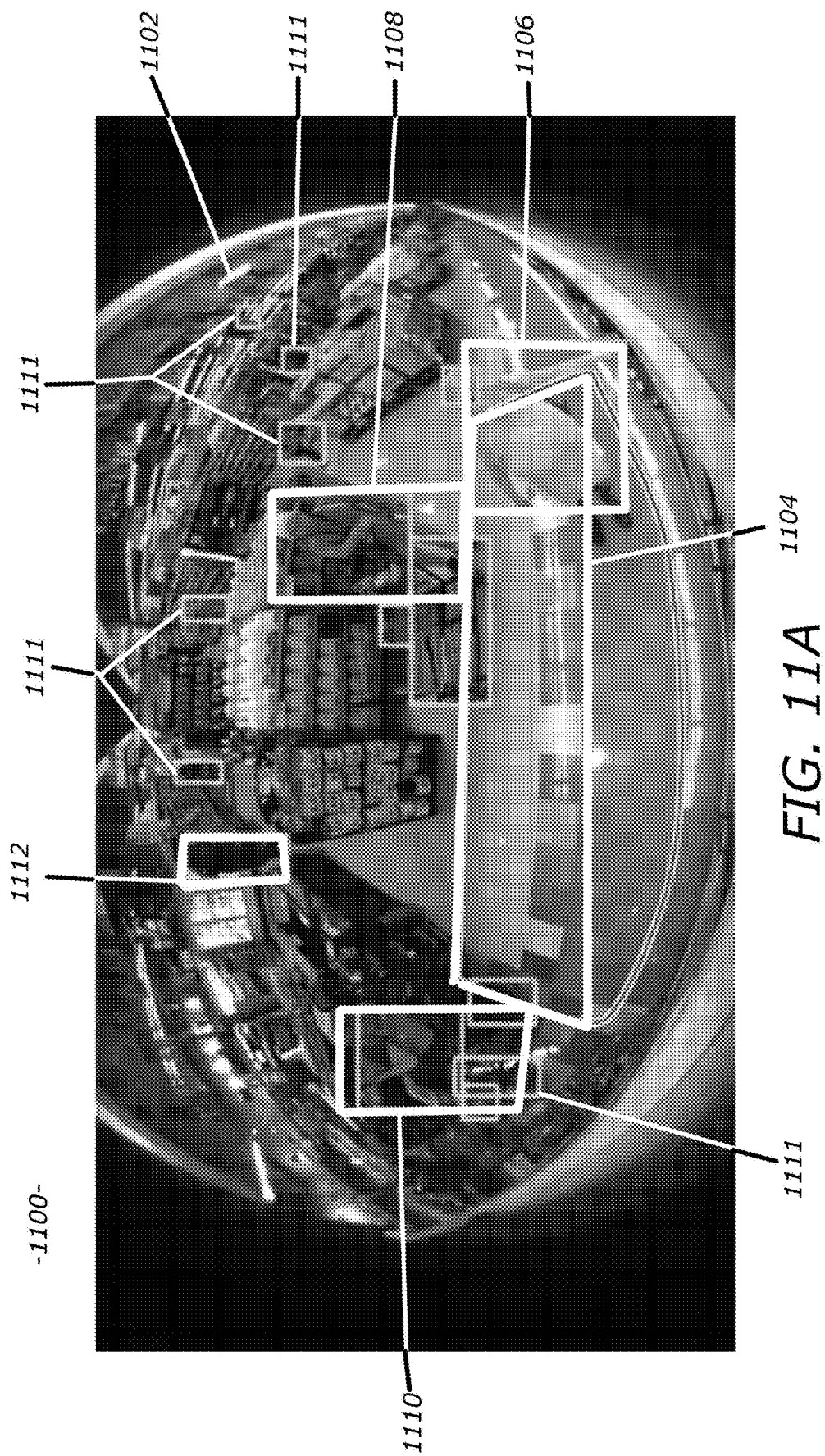
FIG. 11A provides a first illustration of an image captured by the proximity sensor of the automated inventory intelligence system of FIG. 1 in accordance with some embodiments.

Referring to FIG. 11A, a first illustration of an image captured by the proximity sensor of the automated inventory intelligence system of FIG. 1 is shown in accordance with some embodiments. The image 1100 provides one exemplary perspective from the proximity camera 107 of FIGS. 1 and 10. The image 1100 provides an illustration of a store environment 1102 including a view of numerous store aisles as well as a geographic region proximate the shelving unit to which the automated inventory intelligence system (and hence the proximity camera 107) is coupled. For example and as shown in FIG. 11A, the proximity camera 107 is configured to capture the image 1100, which provides a capture of objects in front of, and approaching, the front of the shelving unit.

In particular, the image 1100 includes an image capture, e.g., a picture, of a region including a first proximity region 1104. Additionally, the image 110 captures a first shopper 1106 at least partially within the first proximity region 1104, and shoppers 1108, 1110 and 1112 outside of the first proximity region 1104. In some embodiments, the image 1100 may capture additional objects 1111. In one embodiment, the proximity logic 728, as seen in FIGS. 7A-7B, is communicatively coupled to the proximity sensor 107 and may determine the graphic(s) to be displayed on the fascia, according to the location of one or more objects detected in the captured image 1100. Specifically, upon receipt of the image 1100 from the proximity sensor 107, the proximity logic 728 may be configured to detect objects within the image 1100 and determine whether each detected object is within a proximity region. In some embodiments, the proximity logic 728 may be configured to detect objects with one or more proximity regions.

For example, as shown in FIG. 11A, a single proximity region 1104 may be utilized such that when an object is detected and determined to be within the proximity region 1104, the proximity logic 728 may transmit one or more instructions causing the automated inventory intelligence system to display a first graphic (e.g., product information) on its fascia, e.g., the fascia $108_1$-$108_4$, as well as the cabinet display top 106. Subsequently, when objects are no longer detected within the proximity region, the proximity logic 728 may transmit one or more instructions causing the automated inventory intelligence system to display a second graphic (e.g., a promotion or other immersive graphic) on the fascia $108_1$-$108_4$ and/or the cabinet display top 106. As will be discussed in further detail below with respect to FIGS. 11B and 12A, the proximity logic 728 may be configured to detect objects and determine whether each object is within one of a plurality of proximity regions such that the automated inventory intelligence system causes the display of various graphics depending on in which region each object is determined to be.

Figure 11B:
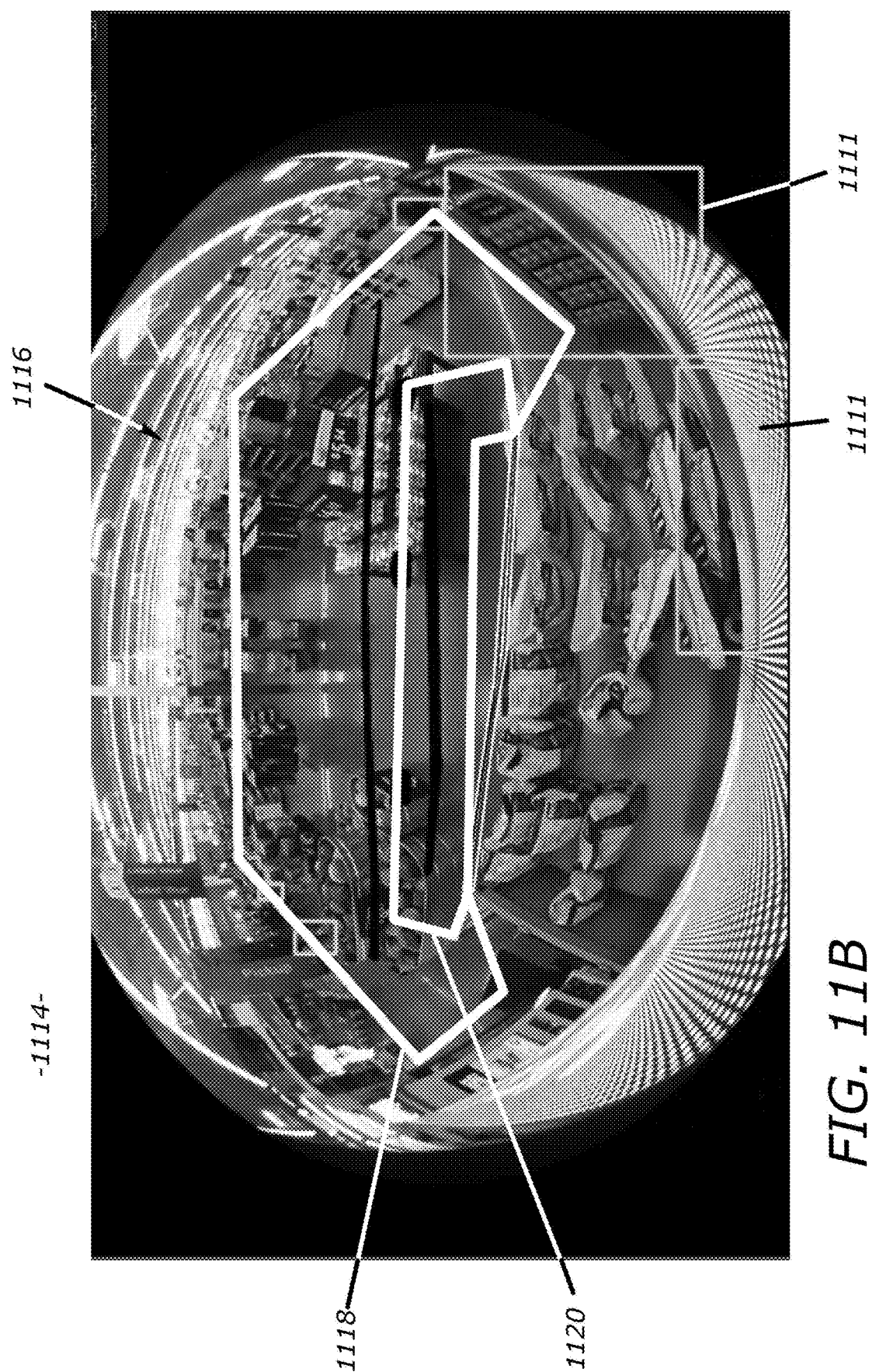
FIG. 11B provides a second illustration of an image captured by the proximity sensor of the automated inventory intelligence system of FIG. 1 in accordance with some embodiments.

Referring to FIG. 11B, a second illustration of an image captured by the proximity sensor of the automated inventory intelligence system of FIG. 1 is shown in accordance with some embodiments. The image 1114 captured by the proximity camera 107 illustrates the proximity logic 728 being configured to detect objects within a plurality of proximity regions, e.g., the first proximity region 1118 and the second proximity region 1120 within the store environment 1116. As will discussed in more detail with respect to FIGS. 12A-12D, the proximity logic 728 may provide instructions that cause the corresponding fascia to display varying graphics depending on whether objects are detected in the first proximity region 1118 and/or the second proximity region 1120. In a variety of embodiments, the second proximity region 1120 may comprise a smaller region compared to the first proximity region 1118 and be located closer to the shelving unit compared to the first proximity region 1118. However, many embodiments may also have first and second proximity regions 1118, 1120 separate and non-overlapping (or a mix of both).

Referring now to FIG. 12A, an exemplary illustration of a plurality of proximity regions based on one configuration of a proximity sensor of an automated inventory intelligence system is shown in accordance with some embodiments. The illustration of FIG. 12A provides an illustration of a first proximity region 1216 and a second proximity region 1218 partially surrounding the shelving unit 1200, with a shopper 1219 located within the first proximity region 1216. The shelving unit 1200, being similar in this embodiment to the shelving unit 102 of FIG. 1, includes a first shelf 1202 and a second shelf 1204 as well as a back component 1206. The shelving unit 1200 may be coupled to the automated inventory intelligence system 1207, which is shown to include inventory cameras $1208_1$-$1208_4$, and fascia $1210_1$-$1210_2$. The automated inventory intelligence system 1207 of the depicted embodiment may be closely equivalent to the automated inventory intelligence system 100 of FIG. 1. Additionally, the shelving unit 1200 may be stocked with inventory such as a first inventory set 1212 and a second inventory set 1214. The first and second inventory sets 1212, 1214 may be monitored by the inventory cameras $1208_1$-$1208_4$ as discussed above in accordance with at least FIGS. 1-5.

In some embodiments, the graphics displayed on the fascia $1210_1$-$1210_2$ may be changed in accordance with instructions provided by the proximity logic 728 based on whether an object is detected in the first proximity region 1216 and/or the second proximity region 1218. For example, in certain embodiments, the proximity logic 728 may receive images captured by a proximity camera, such as the proximity camera 107, and perform object recognition techniques, e.g., such as those discussed above with respect to the images captured by the inventory cameras $110_1$-$110_i$. In other embodiments, the images captured by the proximity camera may be provided to the object recognition logic 720. Based on the detection of one or more objects in one or more of the first proximity region 1216 and/or the second proximity region 1218, the proximity logic 728 may cause the automated inventory intelligence system 1207 to change states, e.g., an immersive state, a promotion state, and a product information state. It should be noted that these are merely exemplary names and that an alternative naming convention may be utilized. Further, more or fewer states may be utilized by the proximity logic 728. For example, the image 1100 of FIG. 11A illustrates a scenario in which the proximity logic 728 may be configured with fewer than three states, e.g., two states.

Figures 12B, 12C, 12D:
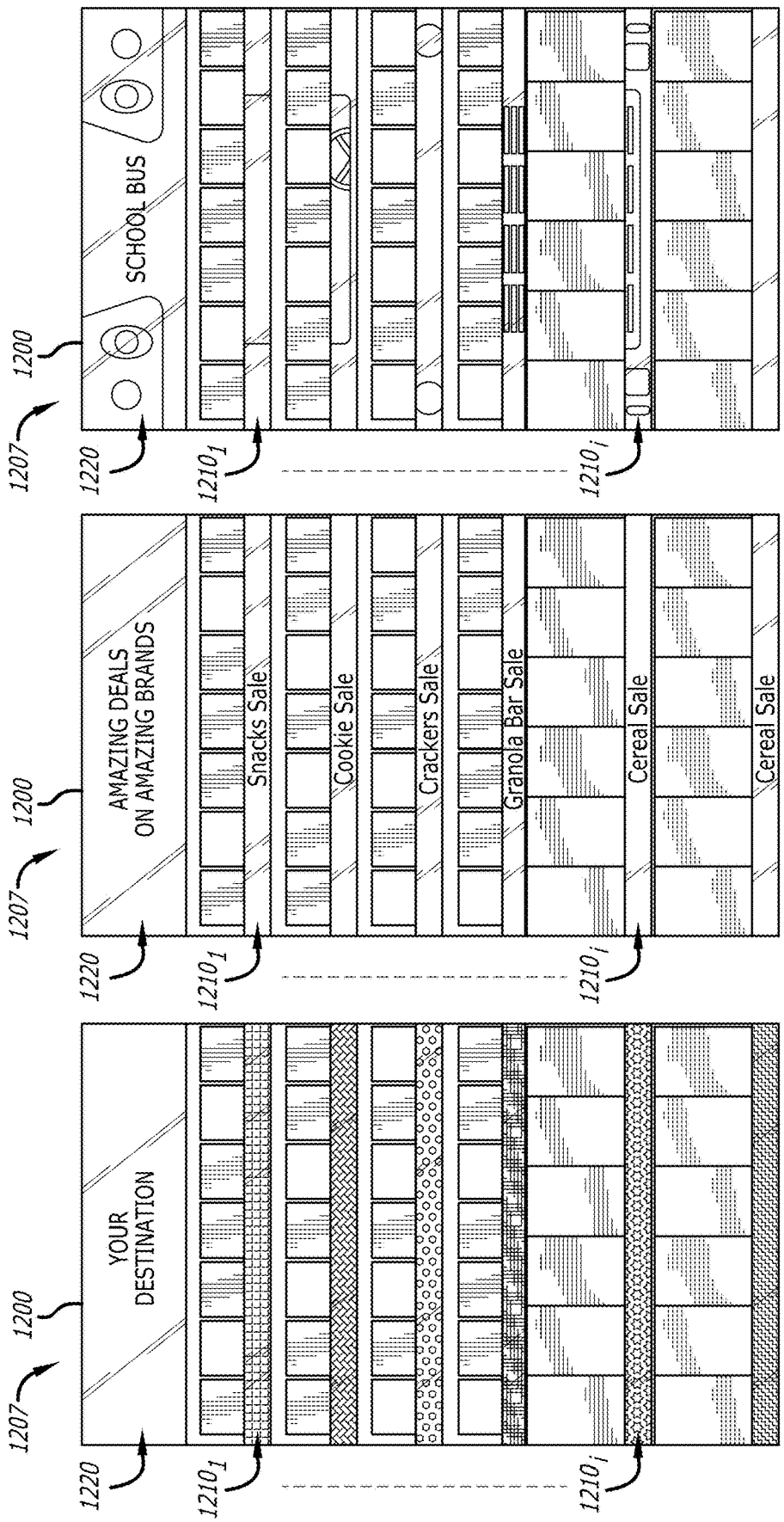
FIG. 12B provides an exemplary illustration fascia of the automated inventory intelligence system of FIG. 12A displaying a first graphic while in a promotion state in accordance with some embodiments.
FIG. 12C provides an exemplary illustration fascia of the automated inventory intelligence system of FIG. 12A displaying a first graphic while in a product information state in accordance with some embodiments.
FIG. 12D provides an exemplary illustration fascia of the automated inventory intelligence system of FIG. 12A displaying a first graphic while in an immersive state in accordance with some embodiments.

As illustrated in FIG. 12A, the shopper 1219 has been detected as being located in the first proximity region 1216. Based on the detection of the shopper 1219 being located in the first proximity region 1216, the proximity logic 728 has caused the automated inventory intelligence system 1207 to enter into a "promotion state" such that the fascia $1210_1$-$1210_2$ are configured to display a promotion graphic (e.g., "Sale!" and "Kids Cereal!"). In the embodiment illustrated in FIG. 12A, the proximity logic 728 may be configured with three possible states: (1) an immersive state triggered when no objects are detected in either of the first proximity region 1216 or the second proximity threshold 1218, wherein the fascia $1210_1$-$1210_2$ are to display an immersive graphic; (2) a promotion state triggered when an object is detected in the first proximity region 1216 but no object detected in the second proximity region 1218, wherein the fascia $1210_1$-$1210_2$ are to display a promotion graphic; and (3) a promotion state triggered when an object is detected in the second proximity region 1218, wherein the fascia $1210_1$-$1210_2$ are to display a product information graphic. Additional fascia, not shown, and/or the cabinet display top 1220 may also display graphics according to the state of the automated inventory intelligence system 1207. Embodiments of an automated inventory intelligence system 1207 in different states are discussed below and illustrated in FIGS. 12B-12D.

As is evident from the illustrations of FIGS. 12A-12D, one goal of the graphics displayed on the cabinet display top 1220 and/or the fascia $1210_1$-$1210_2$ is to grab the attention of shoppers and prolong dwell time in front of the shelving unit 1200, which makes it more likely the shopper will purchase an item stocked on the shelving unit 1200. Specifically, the invention provides manufacturers and retailers the advantage of enabling point of sale marketing through dynamic video and animation.

The discussion of FIGS. 12B-12D will be in reference to FIG. 12A. Referring now to FIG. 12B, an exemplary illustration fascia of the automated inventory intelligence system 1207 displaying a first graphic while in a promotion state is shown in accordance with some embodiments. FIG. 12B illustrates the shelving unit 1200 of FIG. 12A coupled to the automated inventory intelligence system of FIG. 12A in a promotion state. The promotion state may correspond to the display of content-specific promotions graphics on one or more of the fascia $1210_1$-$1210_i$ and cabinet display top 1220. In particular embodiments, the graphics displayed may be (i) specific to the items stocked on the shelving unit, (ii) specific to the brands having items stocked on the shelving unit, (iii) promotions and/or discounts specific to the items stocked on the shelving unit, etc. As is illustrated in FIG. 12B, the proximity logic 728 has provided instructions causing the fascia $1210_1$-$1210_i$ to display promotional information, e.g., a promotion benefitting schools by virtue of purchasing cereal and returning a portion of the cereal box, which corresponds to the items, e.g., cereal, stocked on the shelving unit 1200.

Referring now to FIG. 12C provides an exemplary illustration fascia of the automated inventory intelligence system of FIG. 12A displaying a first graphic while in a product information state is shown in accordance with some embodiments. FIG. 12C illustrates the shelving unit 1200 of FIG. 12A coupled to the automated inventory intelligence system 1207 in a product information state. The product information state may correspond to the display of product specific information graphics, including pricing information, on one or more of the fascia $1210_1$-$1210_i$ and cabinet display top 1220. In some embodiments, the product information state may include information similar to information displayed in the promotion state including discounts or promotions on particular items or with particular brands. As is illustrated in FIG. 12C, the proximity logic 728 has provided instructions causing the fascia $1210_1$-$1210_i$ to display product information, e.g., pricing information for each of the items stocked on the shelving unit 1200.

Referring to FIG. 12D provides an exemplary illustration fascia of the automated inventory intelligence system 1207 displaying a first graphic while in an immersive state is shown in accordance with some embodiments. FIG. 12D illustrates the shelving unit 1200 of FIG. 12A coupled to the automated inventory intelligence system 1207 in an immersive state. The immersive state may correspond to the display of graphics which may span a plurality of the fascia $1210_1$-$1210_i$. The graphics displayed while the automated inventory intelligence system 1207 is in the immersive state are intended to grab the attention of shoppers not standing immediately in front of the shelving unit 1200. In some embodiments, the graphics displayed while the automated inventory intelligence system 1207 can be in the immersive state span from the cabinet display top 1220 and across each of the fascia $1210_1$-$1210_i$. For example, as is illustrated in FIG. 12D, the proximity logic 728 has provided instructions causing the cabinet display top 1220 and the fascia $1210_1$-$1210_i$ to display an immersive graphic, e.g., an animation of a school bus. In such an embodiment, the graphic may be animated wherein lights of the school bus may appear to flash and/or the school bus may appear to be approaching the edge of the shelving unit 1200 facing customers and the retail environment.

c. Proximity Region Detection Methodology

Figure 13:
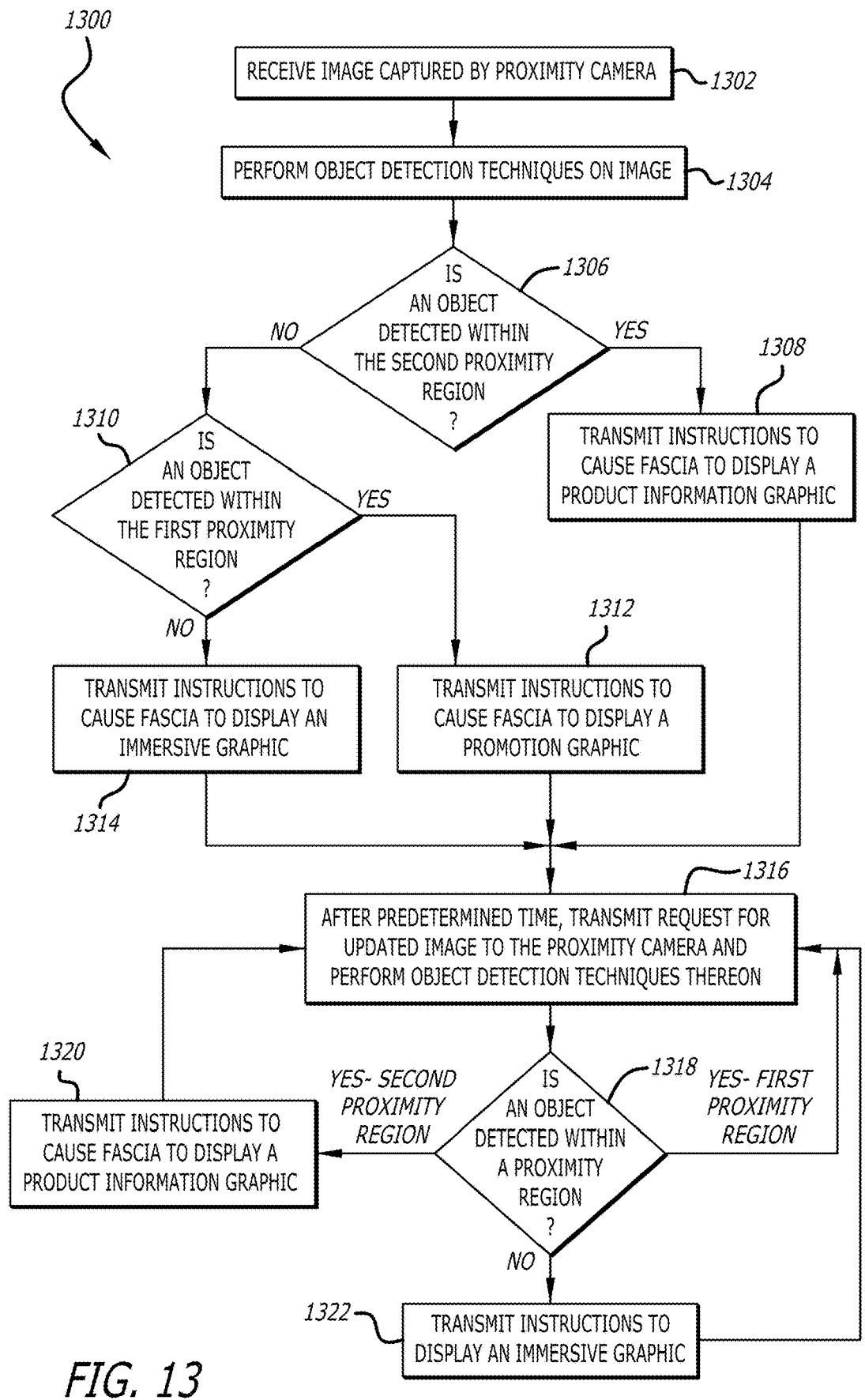
FIG. 13 provides an exemplary flowchart illustrating operations corresponding to detecting whether an object is located within one of a plurality of proximity regions performed by an automated inventory intelligence system in accordance with some embodiments.

Referring to FIG. 13, an exemplary flowchart illustrating operations corresponding to detecting whether an object is located within one of a plurality of proximity regions performed by an automated inventory intelligence system is shown in accordance with some embodiments. Each block illustrated in FIG. 13 represents an operation performed in the method 1300 of detecting whether an object is located within one of a plurality of proximity regions performed by an automated inventory intelligence system. FIG. 13 will be discussed with reference to FIGS. 12A-12D. The method 1300 begins when an image captured by a proximity sensor, e.g., the proximity camera 107, is received (block 1302).

Following receipt of the image from the proximity camera 107, object recognition techniques, as described above, can be performed on the image (block 1304).

Subsequent to the performance of object recognition techniques, a determination is made as to whether an object is detected within the second proximity region 1218 of FIG. 12A, i.e., a proximity region closest to the proximity camera 107 (block 1306). When an objected is detected within the second proximity region 1218, instructions are transmitted by the proximity logic 728 that are configured to cause fascia, e.g., the fascia $1210_1$-$1210_i$, and/or the cabinet display top 1220 to display a product information graphic (block 1308). The method 1300 then continues the operations discussed below with respect to FIG. 13.

When an objected is not detected within the second proximity region 1218, a determination is made as to whether an object is detected within the first proximity region 1216 of FIG. 12A, (block 1310). When an objected is detected within the first proximity region 1216 but not the second proximity region 1218, instructions are transmitted by the proximity logic 728 that are configured to cause fascia, e.g., the fascia $1210_1$-$1210_i$, and/or the cabinet display top 1220 to display a promotion graphic (block 1312). The method 1300 then continues the operations discussed below with respect to FIG. 13.

When an objected is not detected within the first proximity region 1216 or the second proximity region 1218, instructions are transmitted by the proximity logic 728 that are configured to cause fascia, e.g., the fascia $1210_1$-$1210_i$, and/or the cabinet display top 1220 to display an immersive graphic (block 1314). The method 1300 then continues the operations discussed below with respect to FIG. 13.

Referring now to FIG. 13, subsequent to the transmission of instructions to display a graphic on the fascia $1210_1$-$1210_i$, and/or the cabinet display top 1220, any of a product information graphic, a promotion graphic or an immersive graphic, the proximity logic 728 can stall for a predetermined amount of time. Following the expiration of the predetermined amount of time, the proximity logic 728 may transmit a request for an updated image to the proximity camera 107 and performs object recognition techniques on the received image (block 1316).

Subsequent to the performance of object recognition techniques, a determination is made as to whether an object is detected within a proximity region (block 1318). When an object is detected only in the first proximity region 1216, i.e., no change since the previous image was captured, no change is instituted to the graphic displayed on the fascia $1210_1$-$1210_i$, and/or the cabinet display top 1220 and the method 1300 returns to block 1316.

When an object is detected in the second proximity region 1218, instructions are transmitted by the proximity logic 728 that are configured to cause fascia, e.g., the fascia $1210_1$-$1210_i$, and/or the cabinet display top 1220 to display a product information graphic (block 1320) and the method 1300 returns to block 1316.

When no object is detected any proximity region, instructions can be transmitted by the proximity logic 728 that are configured to cause fascia, e.g., the fascia $1210_1$-$1210_i$, and/or the cabinet display top 1220 to display an immersive graphic (block 1322) and the method 1300 returns to block 1316.

Figure 14:
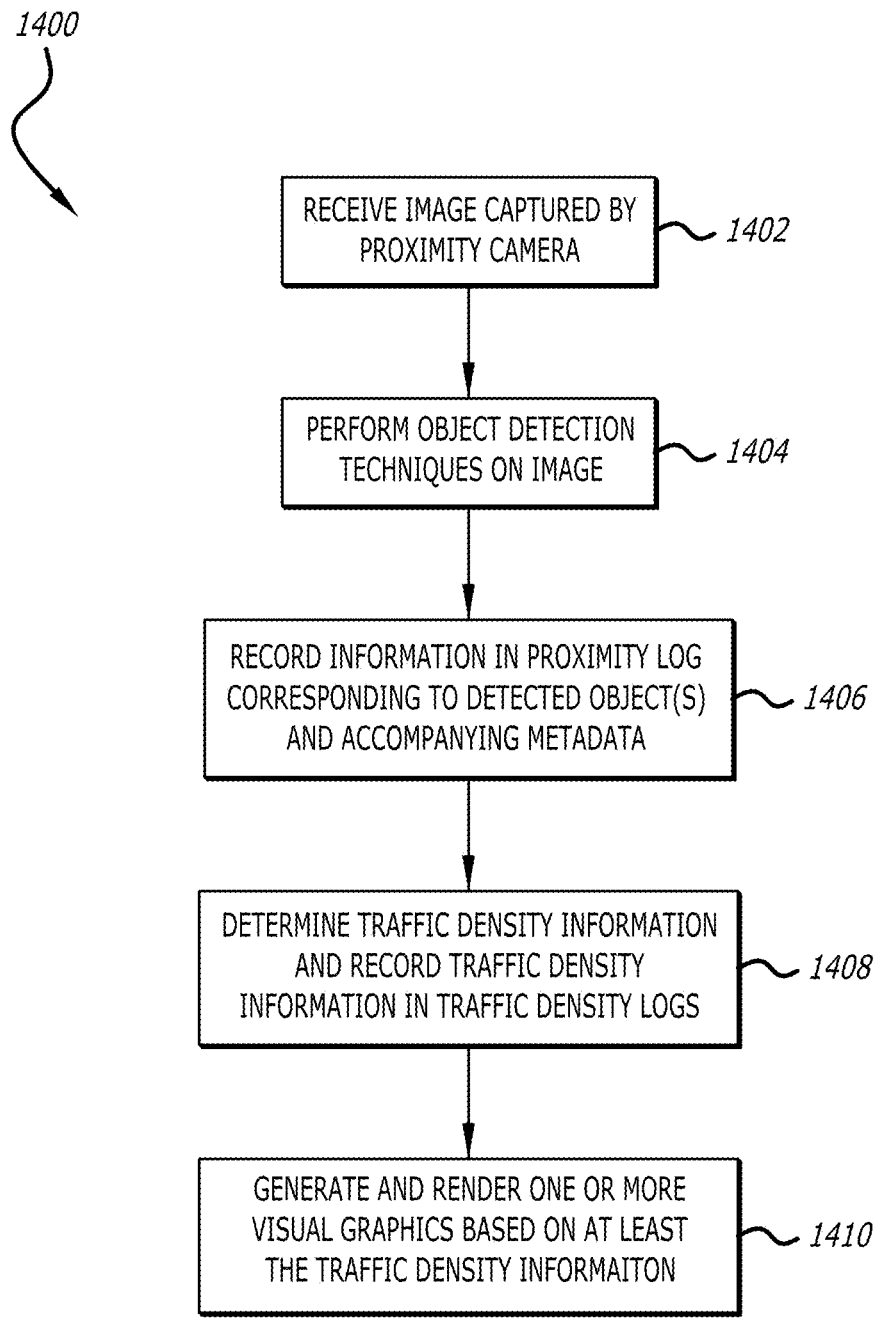
FIG. 14 provides an exemplary flowchart illustrating operations corresponding to detecting one or more objects in one or more of a plurality of proximity regions and generating activity logs performed by an automated inventory intelligence system in accordance with some embodiments.

Referring to FIG. 14, an exemplary flowchart illustrating operations corresponding to detecting one or more objects in one or more of a plurality of proximity regions and generating activity logs performed by an automated inventory intelligence system is shown in accordance with some embodiments. Each block illustrated in FIG. 14 represents an operation performed in the method 1400 of detecting one or more objects in one or more of a plurality of proximity regions and generating activity logs performed by an automated inventory intelligence system. The method 1400 begins when an image captured by a proximity sensor, e.g., the proximity camera 107, is received by, e.g., the proximity logic 728 and/or the object recognition logic 720 (block 1402). Following receipt of the image from the proximity camera 107, object recognition techniques, as described above, are performed on the image (block 1404).

Upon completion of the object recognition techniques, information corresponding to the detected object(s) and accompanying metadata is recorded in a proximity log, e.g., the proximity log 732 of FIGS. 7A-7B (block 1406). Based on the information corresponding to the detected object(s) and the accompanying metadata, traffic density information can be determined, e.g., by the proximity logic 728, and recorded in a traffic density log, e.g., the traffic log 734 of FIGS. 7A-7B (block 1408). The traffic density information may include, but is not limited or restricted to, traffic density (of shoppers, employees, or a mix of either) over a given time period (broken down in time frames including by the hours of the day, days of the week, etc.), inventory on the corresponding unit during each time frame, the display on the fascia and/or the cabinet top display during each time frame, demographic data of each shopper, location of the retail location, location of the shelving unit within the retail location, an outdoor temperature at the retail location during a given time frame (e.g., exact, average, etc.), etc. In certain embodiments, the shelving unit may be able to differentiate shoppers from employees due to an identifying uniform/object (which can be parsed by the object detection techniques described above) or via a signal transmission (from, for example, employee cards/identification badges).

In addition, the proximity logic 728 and/or the alert generation logic 724 may generate and cause the rendering of one or more visual graphic displays based on at least in part the traffic density information (block 1410). Exemplary visual graphic displays are illustrated in FIGS. 15A-15B.

d. Visual Graphic Display of Traffic Density Information

Figure 15A:
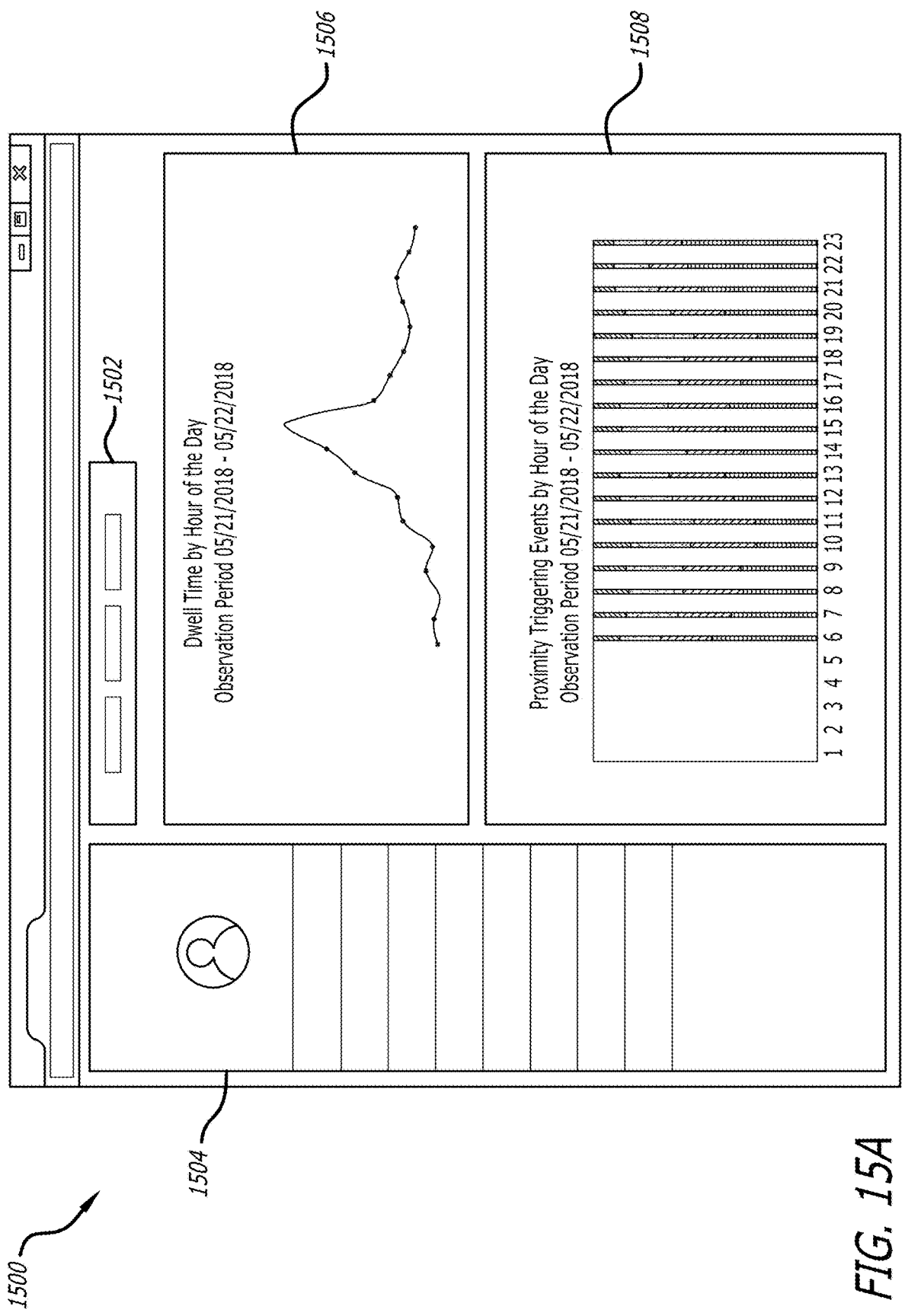
FIG. 15A provides an exemplary embodiment of a first user interface display screen produced by an automated inventory intelligence system, where the first user interface display screen provides an interactive dashboard in accordance with some embodiments.
Figure 15B:
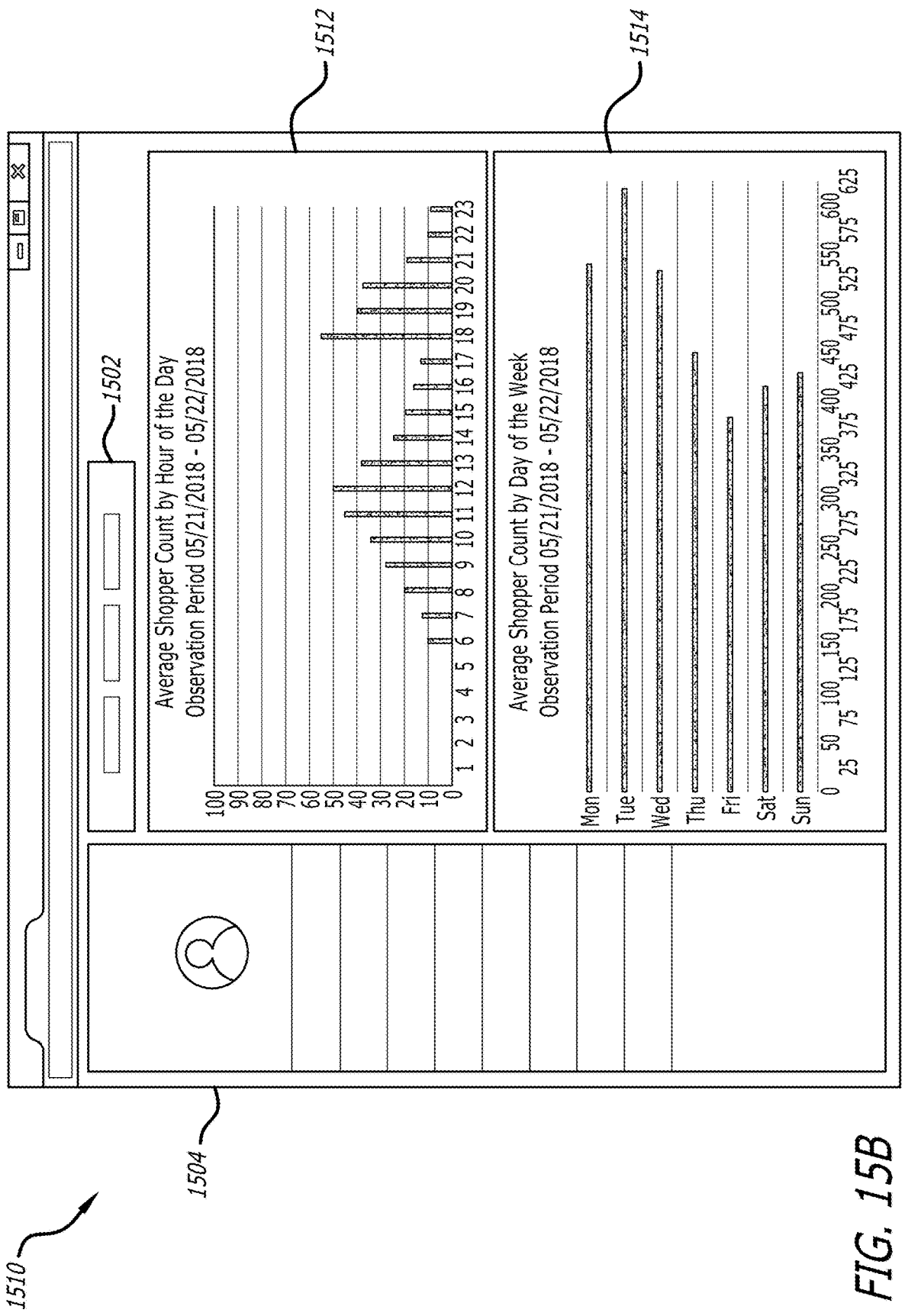
FIG. 15B provides an exemplary embodiment of a second user interface display screen produced by an automated inventory intelligence system, where the second user interface display screen provides an interactive dashboard in accordance with some embodiments.

Referring to FIG. 15A, an exemplary embodiment of a first user interface display screen produced by an automated inventory intelligence system, where the first user interface display screen provides an interactive dashboard is shown in accordance with some embodiments. The first user interface display screen 1500 generated by either the proximity logic 728 and/or the alert generation logic 724, and rendered by the alert generation logic 724 comprises a plurality of display areas including a top navigation panel 1502, a side navigation panel 1504, a first graphical display area 1506 and a second graphical display area 1508.

The top navigation panel 1502 may include graphic display elements, each configured to receive user input and cause performance of specific operations including filtering options and/or a downloading options. The side navigation panel 1504 may include graphic display elements, each configured to receive user input and cause performance of specific operations such as rendering of user interface display screens directed to options or links such as: administrative options or links, media player options or links, triggering options or links (e.g., of one or more of the sensors included in the automated inventory intelligence system 700 as seen in FIGS. 7A-7B), etc.

The first graphical display area 1506 and the second graphical display area 1508 may provide information pertaining to the traffic density information in a graphical user interface format including a graphical display of dwell time of shoppers by the hour of the day for a given period of time (e.g., the first graphical display area 1506) and/or a graphical display of proximity triggering events by the hour of the day for a given period of time (second graphical display area 1508).

Referring now to FIG. 15B, an exemplary embodiment of a second user interface display screen produced by an automated inventory intelligence system, where the second user interface display screen provides an interactive dashboard is shown in accordance with some embodiments. The second user interface display screen 1510 generated in many embodiments by either the proximity logic 728 and/or the alert generation logic 724, and rendered by the alert generation logic 724 comprises a plurality of display areas including the top navigation panel 1502, the side navigation panel 1504, a third graphical display area 1512 and a fourth graphical display area 1514.

The third graphical display area 1512 and the fourth graphical display area 1514 may provide information pertaining to the traffic density information in a graphical user interface format including a graphical display of an average shopper count by the hour of the day for a given period of time (e.g., the third graphical display area 1512) and/or a graphical display of average shopper count by the day of the week for a given period of time (fourth graphical display area 1514). It should be noted that the graphical displays provided by the graphical display areas 1506, 1508, 1512 and 1514 are merely examples and representative of graphical displays that may be generated by the proximity logic 728 and/or the alert generation logic 724 based at least in part on the traffic density information.

As will be understood by those skilled in the art, the descriptions of logics utilized in the embodiments depicted in FIGS. 8-15B are not limiting. In fact, various processes performed by a certain logic may be configured to be performed by a separate logic, and/or a comparable logic/service located remotely in, for example, a cloud computing service. Indeed, a mix or match of various logics located locally and the remotely may exist within the system.

While some particular embodiments have been provided herein, and while the particular embodiments have been provided in some detail, it is not the intention for the particular embodiments to limit the scope of the concepts presented herein. Additional adaptations and/or modifications can appear to those of ordinary skill in the art, and, in broader aspects, these adaptations and/or modifications are encompassed as well. Accordingly, departures may be made from the particular embodiments provided herein without departing from the scope of the concepts provided herein.

What is claimed is:

1. A proximity camera system, comprising:
one or more cameras having a lens and a housing, wherein the one or more cameras comprise at least one or more of a proximity camera, an inventory camera, and a facial recognition camera;
one or more fascia;
a shelving unit coupled to the one or more cameras and the one or more fascia, wherein the shelving unit comprises a graphical display;
one or more processors communicatively coupled to at least one or more of the shelving unit, the one or more cameras, and the one or more fascia; and
a non-transitory computer-readable medium communicatively coupled to the one or more processors and having logics thereon, the logics, when executed by the one or more processors, being configured to perform operations including:
receiving one or more images captured by the one or more cameras;
performing at least one or more recognition techniques to analyze the received one or more images;
determining whether one or more objects were detected within a first predetermined proximity region of the received one or more images relating to the performed one or more recognition techniques;
transmitting one or more instructions configured to cause the graphical display to be displayed by the one or more fascia relating to the detected one or more objects within the first predetermined proximity region, wherein the detected one or more objects are associated with at least one or more data points including proximity data, inventory data, customer facial data, trend data, and traffic density data, and wherein the graphical display displayed by the one or more fascia includes one or more first graphics having at least inventory information, advertisement information, and customer trend information relating to the one or more data points associated with the detected one or more objects; and
creating an effectiveness score relating to the displayed inventory information, advertisement information, and customer trend information stored within one or more training logs in the non-transitory computer-readable medium, such that one or more second graphics displayed are trained from the one or more first graphics that were previously displayed in relation to the created effectiveness score.

2. The proximity camera system of claim 1, wherein the shelving unit comprises one or more shelves that hold one or more inventory items, wherein the logics comprise an inventory threshold logic, a facial recognition logic, and a proximity logic, wherein the inventory threshold logic is configured to hold manage inventory associated with the one or more inventory items using the inventory camera, wherein the facial recognition logic is configured to determine customer trends based on one or more parameters using the facial recognition camera, and wherein the one or more parameters comprise at least one or more of ethnicity, age, gender, time of visit, geographic location, sales, time of day, time of the year, day of the week, and effectiveness trends relating to the created effectiveness score and the one or more first and second graphics displayed by the graphic display.

3. The proximity camera system of claim 2, wherein the image illustrates a geo-fence region at least partially surrounding the shelving unit, the geo-fence region including the first predetermined proximity region, and wherein the determined customer trends are stored in the customer data, and the managed inventory of the one or more inventory items are stored in the inventory data.

4. The proximity camera system of claim 2, wherein the proximity logic is configured to determine whether a second object is detected within a second predetermined proximity region of the received one or more images relating to the performed one or more recognition techniques, the second proximity region including a physical area closer to the shelving unit than the first predetermined proximity region, wherein the proximity logic is configured to determine when a customer is at least within the first predetermined proximity region to thereby transmit the transmitted one or more instructions that cause the one or more first graphics or the one or more second graphics to be displayed or changed on the graphical display, and wherein the proximity logic is thereby configured to provide the proximity data used to track: (i) the created effectiveness score relating to the customer and the one or more first graphics, and (ii) a second effectiveness score relating to the customer and the trained one or more second graphics.

5. The proximity camera system of claim 2, wherein the facial recognition logic is further configured to generate the traffic density data relating to an overall customer traffic captured by the facial recognition camera, and wherein the overall customer traffic is based on a number of unique faces and a number of non-unique faces that are detected within a given time period from the customer facial data.

6. The proximity camera system of claim 1, wherein the image is transmitted to a cloud computing service for analysis of the first predetermined proximity region.

7. The proximity camera system of claim 1, wherein the graphical display displayed by the one or more fascia includes an immersive graphic of the one or more first graphics.

8. The proximity camera system of claim 7, wherein the immersive graphic spans a plurality of the one or more fascia.

9. The proximity camera system of claim 7, further comprising a cabinet display top communicatively coupled to the one or more processors and the non-transitory computer-readable medium, and wherein the immersive graphic spans a plurality of the one or more fascia and the cabinet display top.

10. The proximity camera system of claim 1, wherein the graphical display displayed by the one or more fascia includes a product information graphic of the one or more first graphics, the product information graphic includes at least pricing information for the one or more inventory items, and wherein the graphical display displayed by the one or more fascia includes a promotional graphic of the one or more first graphics, the promotional graphic includes at least information corresponding to a promotion or discount for the one or more inventory items.

11. A computerized method, the method comprising:
receiving one or more images captured by the one or more cameras, wherein the one or more cameras comprise at least one or more of a proximity camera, an inventory camera, and a facial recognition camera, wherein the one or more cameras are coupled to one or more fascia and a shelving unit, and wherein the shelving unit comprises a graphical display;
performing at least one or more recognition techniques to analyze the received one or more images;
determining whether one or more objects were detected within a first predetermined proximity region of the received one or more images relating to the performed one or more recognition techniques;
transmitting one or more instructions configured to cause the graphical display to be displayed by the one or more fascia relating to the detected one or more objects within the first predetermined proximity region, wherein the detected one or more objects are associated with at least one or more data points including proximity data, inventory data, customer facial data, trend data, and traffic density data, and wherein the graphical display displayed by the one or more fascia includes one or more first graphics having at least inventory information, advertisement information, and customer trend information relating to the one or more data points associated with the detected one or more objects; and
creating an effectiveness score relating to the displayed inventory information, advertisement information, and customer trend information stored within one or more training logs in the non-transitory computer-readable medium, such that one or more second graphics displayed are trained from the one or more first graphics that were previously displayed relating to the created effectiveness score.

12. The computerized method of claim 11, wherein the shelving unit comprises one or more shelves that hold one or more inventory items, wherein the logics comprise an inventory threshold logic, a facial recognition logic, and a proximity logic, wherein the inventory threshold logic is configured to manage inventory associated with the one or more inventory items using the inventory camera, wherein the facial recognition logic is configured to determine customer trends based on one or more parameters using the facial recognition camera, and wherein the one or more parameters comprise at least one or more of ethnicity, age, gender, time of visit, geographic location, sales, time of day, time of the year, day of the week, and effectiveness trends relating to the created effectiveness score and the one or more first and second graphics displayed by the graphic display, wherein the facial recognition logic is further configured to generate the traffic density data relating to an overall customer traffic captured by the facial recognition camera, and wherein the overall customer traffic is based on a number of unique faces and a number of non-unique faces that are detected within a given time period from the customer facial data.

13. The computerized method of claim 12, wherein the image illustrates a geo-fence region at least partially surrounding the shelving unit, the geo-fence region including the first predetermined proximity region, and wherein the determined customer trends are stored in the customer data, and the managed inventory of the one or more inventory items are stored in the inventory data.

14. The computerized method of claim 12, further comprising determining whether a second object is detected within a second predetermined proximity region of the received one or more images using the proximity logic, the second proximity region including a physical area closer to the shelving unit than the first predetermined proximity region, wherein the proximity logic is configured to determine when a customer is at least within the first predetermined proximity region to thereby transmit the transmitted one or more instructions that cause the one or more first graphics or the one or more second graphics to be displayed or changed on the graphical display, and wherein the proximity logic is thereby configured to provide the proximity data used to track: (i) the created effectiveness score relating to the customer and the one or more first graphics, and (ii) a second effectiveness score relating to the customer and the trained one or more second graphics.

15. The computerized method of claim 12, wherein the graphical display displayed by the one or more fascia includes an immersive graphic of the one or more first graphics that spans a plurality of the one or more fascia.

16. A non-transitory computer readable storage medium having stored thereon instructions, the instructions being executable by one or more processors to perform operations comprising:
receiving one or more images captured by the one or more cameras, wherein the one or more cameras comprise at least one or more of a proximity camera, an inventory camera, and a facial recognition camera, wherein the one or more cameras are coupled to one or more fascia and a shelving unit, and wherein the shelving unit comprises a graphical display;

performing at least one or more recognition techniques to analyze the received one or more images;

determining whether one or more objects were detected within a first predetermined proximity region of the received one or more images relating to the performed one or more recognition techniques;

transmitting one or more instructions configured to cause the graphical display to be displayed by the one or more fascia relating to the detected one or more objects within the first predetermined proximity region, wherein the detected one or more objects are associated with at least one or more data points including proximity data, inventory data, customer facial data, trend data, and traffic density data, and wherein the graphical display displayed by the one or more fascia includes one or more first graphics having at least inventory information, advertisement information, and customer trend information relating to the one or more data points associated with the detected one or more objects; and creating an effectiveness score relating to the displayed inventory information, advertisement information, and customer trend information stored within one or more training logs in the non-transitory computer-readable medium, such that one or more second graphics displayed are trained from the one or more first graphics that were previously displayed relating to the created effectiveness score.

17. The non-transitory computer readable storage medium of claim 16, wherein the shelving unit comprises one or more shelves that hold one or more inventory items, wherein the logics comprise an inventory threshold logic, a facial recognition logic, and a proximity logic, wherein the inventory threshold logic is configured to manage inventory associated with the one or more inventory items using the inventory camera, wherein the facial recognition logic is configured to determine customer trends based on one or more parameters using the facial recognition camera, and wherein the one or more parameters comprise at least one or more of ethnicity, age, gender, time of visit, geographic location, sales, time of day, time of the year, day of the week, and effectiveness trends relating to the created effectiveness score and the one or more first and second graphics displayed by the graphic display, wherein the facial recognition logic is further configured to generate the traffic density data relating to an overall customer traffic captured by the facial recognition camera, and wherein the overall customer traffic is based on a number of unique faces and a number of non-unique faces that are detected within a given time period from the customer facial data.

18. The non-transitory computer readable storage medium of claim 17, wherein the image illustrates a geo-fence region at least partially surrounding the shelving unit, the geo-fence region including the first predetermined proximity region, and wherein the determined customer trends are stored in the customer data, and the managed inventory of the one or more inventory items are stored in the inventory data.

19. The non-transitory computer readable storage medium of claim 18, wherein the graphical display displayed by the one or more fascia includes an immersive graphic of the one or more first graphics that spans a plurality of the one or more fascia.

20. The non-transitory computer readable storage medium of claim 17, wherein the instructions being executable by the one or more processors to perform further operations comprising determining whether a second object is detected within a second predetermined proximity region of the received one or more images using the proximity logic, the second proximity region including a physical area closer to the shelving unit than the first predetermined proximity region, wherein the proximity logic is configured to determine when a customer is at least within the first predetermined proximity region to thereby transmit the transmitted one or more instructions that cause the one or more first graphics or the one or more second graphics to be displayed or changed on the graphical display, and wherein the proximity logic is thereby configured to provide the proximity data used to track: (i) the created effectiveness score relating to the customer and the one or more first graphics, and (ii) a second effectiveness score relating to the customer and the trained one or more second graphics.

* * * * *